United States Patent
Tlaskal

(10) Patent No.: US 6,756,994 B1
(45) Date of Patent: Jun. 29, 2004

(54) METHOD AND APPARATUS FOR HANDLING SECONDARY DEPENDENCIES

(75) Inventor: Martin Paul Tlaskal, Elizabeth Bay (AU)

(73) Assignee: Canon Kabushiki Kaisha, Tokyo (JP)

( * ) Notice: Subject to any disclaimer, the term of this patent is extended or adjusted under 35 U.S.C. 154(b) by 427 days.

(21) Appl. No.: 09/633,886

(22) Filed: Aug. 7, 2000

(51) Int. Cl.$^7$ ................................................ G09G 5/00
(52) U.S. Cl. ........................ 345/648; 345/440; 345/441; 345/619; 345/622; 345/672
(58) Field of Search ................................ 345/440, 648, 345/619, 622, 672, 441

(56) References Cited

U.S. PATENT DOCUMENTS

| | | | | |
|---|---|---|---|---|
| 4,935,730 A | * | 6/1990 | Kosuka | 345/544 |
| 5,274,718 A | * | 12/1993 | Leonardi et al. | 382/240 |
| 5,537,528 A | * | 7/1996 | Takahashi et al. | 707/512 |
| 5,933,843 A | * | 8/1999 | Takai | 707/526 |
| 6,003,033 A | * | 12/1999 | Amano et al. | 707/100 |
| 6,191,797 B1 | * | 2/2001 | Politis | 345/440 |
| 6,483,519 B1 | * | 11/2002 | Long et al. | 345/619 |

* cited by examiner

*Primary Examiner*—Matthew C. Bella
*Assistant Examiner*—Manucher Rahmjoo
(74) *Attorney, Agent, or Firm*—Fitzpatrick, Cella, Harper & Scinto

(57) ABSTRACT

A method and apparatus for creating a series of images is disclosed. The method manages secondary dependencies of regions in a more efficient manner than the prior art. The present invention creates contents labels that represent either leaf node regions or the composition of two other contents labels, manages the reference counting of contents labels and provides a means for determining if there exists a contents label which represents the composition of two other contents labels. The present invention damages contents labels by preferably adding entries to a damage hash table. The present invention utilizes secondary dependency "Directed Acyclic Graphs" (herein referred to as "Dags") (700) which are stored in every binary node and define the secondary dependency relationship between the contents label created in that node. Information is provided by the present invention as to whether a contents label which has the potential to come into existence is damaged in any way, via examination of secondary dependency Dags associated with the contents label. Information is also provided on whether rendering can be avoided by determining the properties of particular compositing operators involved in a rendering operation.

45 Claims, 10 Drawing Sheets $$A = (C_1 o .. o C_{N/2}) o (C_{N/2+1} o .... o C_N)$$

FIG. 4

METHOD AND APPARATUS FOR HANDLING SECONDARY DEPENDENCIES

TECHNICAL FIELD OF THE INVENTION

The present invention relates to the creation of computer-generated images both in the form of still pictures and video imagery, and, in particular, relates to efficient process, apparatus, and systems for creating an image made up by compositing multiple components. The invention also relates to a computer program product including a computer readable medium having recorded thereon a computer program for creating an image made up by compositing multiple components.

BACKGROUND ART

Computer generated images are typically made up of many differing components, graphical elements or graphical objects which are rendered and composited together to create a final image. In recent times, an "opacity channel" (also known as a "matte", an "alpha channel", or simply "opacity") has been commonly used. The opacity channel contains information regarding the transparent nature of each element. The opacity channel is stored alongside each instance of a colour, so that, for example, a pixel-based image with opacity, stores an opacity value as part of the representation of each pixel. An element without explicit opacity channel information is typically understood to be fully opaque or partially transparent within some defined bounds of the element, and assumed to be completely transparent outside those bounds.

An expression tree offers a systematic means for representing an image in terms of its constituent elements and which facilitates later rendering. Expression trees typically comprise a plurality of nodes including leaf nodes, unary nodes and binary, nodes. Nodes of higher degree, or of alternative definition may also be used. A leaf node, being the outer most node of an expression tree, has no descendent nodes and represents a primitive constituent of an image. Unary nodes represent an operation which modifies the pixel data coming out of the part of the tree below the unary operator. Unary nodes include such operations as colour conversions, convolutions (blurring etc) and operations such as red-eye removal. A binary node typically branches to left and right subtrees, wherein each subtree is itself an expression tree comprising at least one leaf node. Binary nodes represent an operation which combines the pixel data of its too children to form a single result. For example, a binary node may be one of the standard "compositing operators" such as OVER, IN, OUT, ATOP and alpha-XOR, examples of which and others are shown in FIG. 2.

Several of the above types of nodes can be combined to form a compositing tree. An example of this is shown in FIG. 1. The result of the left-hand side of the compositing tree may be interpreted as a colour converted image being clipped to spline boundaries. This construct is composited with a second image.

Although the non-transparent area of a graphical element can of itself be of certain size, it need not be entirely visible in a final image, or only a portion of the element may have an effect on the final image. For example, assume an image of a certain size is to be displayed on a display. If the image is positioned so that only the top left corner of the image is displayed by the display device, the remainder of the image is not displayed. The final image as displayed on the display device thus comprises the visible portion of the image, and the invisible portion in such a case need not be rendered.

Another way in which only a portion of an element may have an effect is when the portion is obscured by another element. For example, a final image to be displayed (or rendered) may comprise one or more opaque graphical elements, some of which obscure other graphical elements. Hence, the obscured elements have no effect on the final image.

A conventional graphics rendering model considers each node to be conceptually infinite in extent. Therefore, to construct the final image, a conventional system would apply a compositing equation at every pixel of the output image. Interactive frame rates of the order greater than 15 frames per second can be achieved by relatively brute-force approaches in these conventional systems, because the actual pixel operations are quite simple and can be highly optimised. This highly optimised code is fast enough to produce acceptable frame rates without requiring complex code. However, this is certainly not true in an alpha compositing environment where complex expressions can be very computationally expensive. Thus, the per-pixel cost of compositing can be quite high since typically an image is rendered in 24-bit colour in addition to an 8-bit alpha channel, thus giving 32 bits per pixel. Each compositing operator has to deal with each of the four channels. Therefore, the approach of completely generating every pixel of every required frame when needed is inefficient. This problem is particularly relevant when performing "Dynamic Rendering".

Dynamic rendering refers to the generation of multiple successive images. Given a compositing tree, it is possible to generate region groups (containing regions) for the compositing tree. The compositing tree represents an initial image. Changes to the tree can be made to make the tree represent a new image. The region groups and the region description of the tree are updated to reflect the modified tree. Performance can be improved by exploiting commonality between the two images.

Australian Patent Publication No. AU-A-47329/99 discloses a method of creating a series of images formed by rendering graphical objects. The method disclosed by Australian Patent Publication No. AU-A-47329/99 exploits the opaqueness of the graphical objects to be rendered during a compositing operation. The contents of Australian Patent Publication No. AU-A47329/99 are incorporated herein by cross-reference.

An example implementation of the method disclosed by AU-A-47329/99 utilises a label referred to as a "Contents Label (CL)" which represents a unique symbolic expression describing the method of construction of image data. The contents label disclosed by AU-A- 47329/99 is implemented as an index into an array of contents label property structures, which are represented by the tag CL_Properties. The terms in the symbolic expression are used to distinguish between different categorisations of the source of image data. Region groups of two distinct leaf nodes in a compositing tree can contain regions that are labelled with distinct contents labels even if their actual image data is equivalent. A region of the image is substantially defined by the boundary outlines of two or more overlapping graphical elements. The example implementation disclosed by AU-A-47329/99 utilises a system of unique integers to represent contents labels. For example, "23" represents "(A over B) over C".

AU-A-47329/99 also described the concepts of "primary" and "secondary" damage in order to demonstrate that it is not always necessary to regenerate an entire image as a result of a change to the compositing tree representing the image. Any region of the image including a compositing equation with an object that has been altered in some way can be said to suffer primary damage. Secondary damage is said to have been incurred by a region, if the object upon which the boundary outline of the region (but not content) depends, changes in some way. By keeping track of dependencies between regions of different content, it only becomes necessary to regenerate image data in regions whose contents have become damaged. These dependencies are referred to as "primary" and "secondary" dependencies. A primary dependency is a contents label (e.g. L') representing an expression which has been constructed by combining L and sonic other contents label. A secondary dependency is a contents label L" which can be indirectly affected if the image represented by the contents label L has changed in some way that the boundary of L is affected, For example, FIG. 9 shows the region subdivision and the respective compositing expressions for a simple compositing tree. Consider therefore the situation in which object A moves by a small amount relative to the other objects. Some regions in the region group at the root of the tree will be affected by A moving.

If opaque case optimisations are ignored, the regions with compositing expressions which include A will be significantly affected by A moving. The region numbers which are so affected are 2, 3, 5 and 6. When updating the region group at the root of the tree, those regions will need their region descriptions and proxies completely recalculated. This situation is an example of primary damage. Further, regions that abut regions which have A in their compositing expression are also effected by A moving, though not as severely as those regions with primary damage. In the example, these other affected regions are 1, 4, 7 and 8. When updating the region group at the root of the tree, these regions will need their region descriptions recalculated. However, their proxies will only need to be recalculated in areas of the new region which were not included in the corresponding earlier region. This situation is an example of secondary damage as discussed above.

The example implementation disclosed by AU-A-47329/99 was deficient in the method used to manage the determination of secondary dependencies and hence secondary damage. Given the existence of a particular composite contents label, the example implementation disclosed by AU-A-47329/99 generated every possible related contents label which could possibly be secondary damaged if the region and associated contents label in question became primary damaged. In compositions with high "depth complexity" a large number of contents labels were generated, the vast majority of which did not exist. Depth complexity in this context means the number of leaf-node graphical objects which intersect one another. Performance degraded rapidly as depth complexity increased, due to the significant burden of creating and damaging such a large number of contents labels.

DISCLOSURE OF THE INVENTION

It is an object of the present invention to substantially overcome, or at least ameliorate, one or more disadvantages of existing arrangements.

According to one aspect of the present invention there is provided a method of creating a series of images, each member of said series being related to a preceding member, said images being formed by rendering a plurality of graphical objects to be composited according to a hierarchical structure representing a compositing expression, said hierarchical structure including a plurality of nodes each representing a component of at least one of said images, each of said objects having a predetermined outline, said method comprising the steps of:

(a) for each said node:
  (i) dividing a component image space in which said outlines are defined into at least one mutually exclusive region, each said region being related to at least one graphical object;
  (ii) examining each said region to determine those objects that contribute to the region;
(b) creating dependency information identifying those said regions that will be affected by a change in any one of said regions;
(c) rendering a first image of said series by compositing all regions substantially according to said hierarchical structure;
(d) in response to at least one change to at least one of said nodes:
  (i) examining said dependency information to identify those of said regions affected by said at least one change, wherein at least one of said regions is indirectly affected by a change to at least one other of said regions, said indirectly affected region being identified by inference through association with at least one other of said affected regions;
  (ii) for each node with affected regions, updating the corresponding identified regions and incorporating into said node those (any) new regions arising from the change and/or removing any of said regions that are no longer relevant,
  (iii) updating said dependency information to reflect changes to said hierarchical structure;
  (iv) rendering a further image of said series by compositing (only) those regions affected by said at least one change; and
(e) repeating step (d) for further changes to at least one of said nodes.

According to another aspect of the present invention there is provided a method of creating a series of images, said images being formed by rendering a plurality of graphical objects to be composited according to a hierarchical structure, said hierarchical structure including a plurality of nodes each representing a component of at least one of said images, each of said objects having a predetermined outline, said method comprising the steps of:

(a) for each said node:
  (iii) dividing a space in which said outlines are defined into at least one mutually exclusive region;
  (iv) examining each said region to determine those objects that contribute to the region;
(b) creating dependency information based on said examination,
(c) rendering a first image of said series utilising said hierarchical structure; and then, in response to at least one chance to at least one of said nodes;
(d) examining said dependency information;
  (i) for a node with affected regions, updating the corresponding regions, wherein at least one of said regions is indirectly affected by a change to at least one other of said regions, said indirectly affected region being identified by inference through association with at least one other of said affected regions;
  (ii) updating said dependency information;
  (iii) rendering a further image of said series by compositing those regions affected by said at least one change; and (e) repeating step (d) for further changes to at least one of said nodes.

According to still another aspect of the present invention there is provided a method of creating a series of images, said images being formed by rendering at least a plurality of graphical objects to be composited according to a hierarchical structure, said hierarchical structure including a plurality of nodes each representing a component of at least one of said images, said method comprising the steps of:

(a) for each said node:
  (i) dividing a component image space in which said graphical objects are defined into at least one region;
  (ii) examining each said region;
(b) creating dependency information for each of said regions;
(c) rendering a first image of said series utilising said hierarchical structure; and then, in response to at least one change to at least one of said nodes;
(d) examining said dependency information;
  (i) for a node with affected regions, updating the corresponding information, wherein at least one of said regions is indirectly affected by a change to at least one other of said regions, said indirectly affected region being identified by inference from being associated with at least one other of said affected regions;
  (ii) updating said dependency record;
  (iii) rendering a further image of said series; and
(e) repeating step (d) for further changes to at least one of said nodes.

According to still another aspect of the present invention there is provided a apparatus for creating a series of images, each member of said series being related to a preceding member, said images being formed by rendering a plurality of graphical objects to be composited according to a hierarchical structure representing a compositing expression, said hierarchical structure including a plurality of nodes each representing a component of at least one of said images, each of said objects having a predetermined outline, said apparatus comprising:

division means for dividing a component image space in which said outlines are defined into at least one mutually exclusive region, each said region being related to at least one graphical object and each said region being examined to determine those objects that contribute to the region;

dependency information creation means for creating dependency information to identify those said regions that will be affected by a change in any one of said regions;

render means for rendering a first image of said series by compositing all regions substantially according to said hierarchical structure;

examination means for examining said dependency information in response to at least one change to at least one of said nodes, to identify those of said regions affected by said at least one change, wherein at least one of said regions is indirectly affected by a change to at least one other of said regions, said indirectly affected region being identified by inference through association with at least one other of said affected regions, and wherein for each node with affected regions, the corresponding identified regions are updated by an updating means and those (any) new regions arising from the change are incorporated into said node and/or any of said regions that are no longer relevant are removed, said dependency information is updated to reflect changes to said hierarchical structure, and wherein said render means renders a further image of said series by compositing (only) those regions affected by said at least one change According to still another aspect of the present invention there is provided a computer readable medium for storing a program for apparatus which processes data, said processing comprising a process for creating a series of images, each member of said series being related to a preceding member, said images being formed by rendering a plurality of graphical objects to be composited according to a hierarchical structure representing a compositing expression, said hierarchical structure including a plurality of nodes each representing a component of at least one of said images, each of said objects having a predetermined outline, said program comprising:

code for dividing a component image space in which said outlines are defined into at least one mutually exclusive region, each said region being related to at least one graphical object;

code for examining each said region to determine those objects that contribute to the region;

code for creating dependency information identifying those said regions that will be affected by a change in any one of said regions;

code for rendering a first image of said series by compositing all regions substantially according to said hierarchical structure;

code for examining said dependency information in response to at least one change to at least one of said nodes, to identify those of said regions affected by said at least one change, wherein at least one of said regions is indirectly affected by a change to at least one other of said regions, said indirectly affected region being identified by inference through association with at least one other of said affected regions;

code for updating the corresponding identified regions for each node with affected regions, and incorporating into said node those (any) new regions arising from the change and/or removing any of said regions that are no longer relevant;

code for updating said dependency information to reflect changes to said hierarchical structure; and code for rendering a further image of said series by compositing (only) those regions affected by said at least one change.

BRIEF DESCRIPTION OF THE DRAWINGS

A number of preferred embodiments of the present invention still now be described with reference to the drawings, in which:

FIG. 4 shows the partitioning of a top-level region group;

DETAILED DESCRIPTION INCLUDING BEST MODE

1.0 Detailed Description

Figure 1:
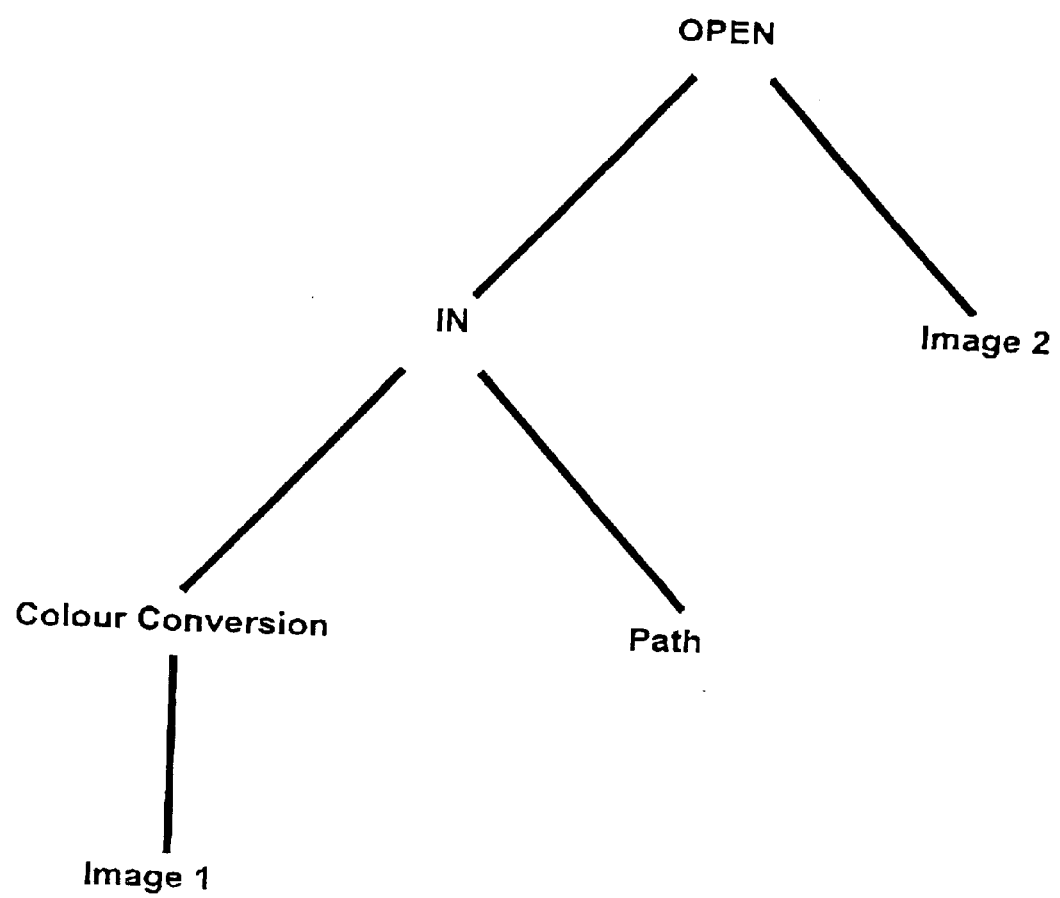
FIG. 1 is an example of a compositing tree.
Figure 2:
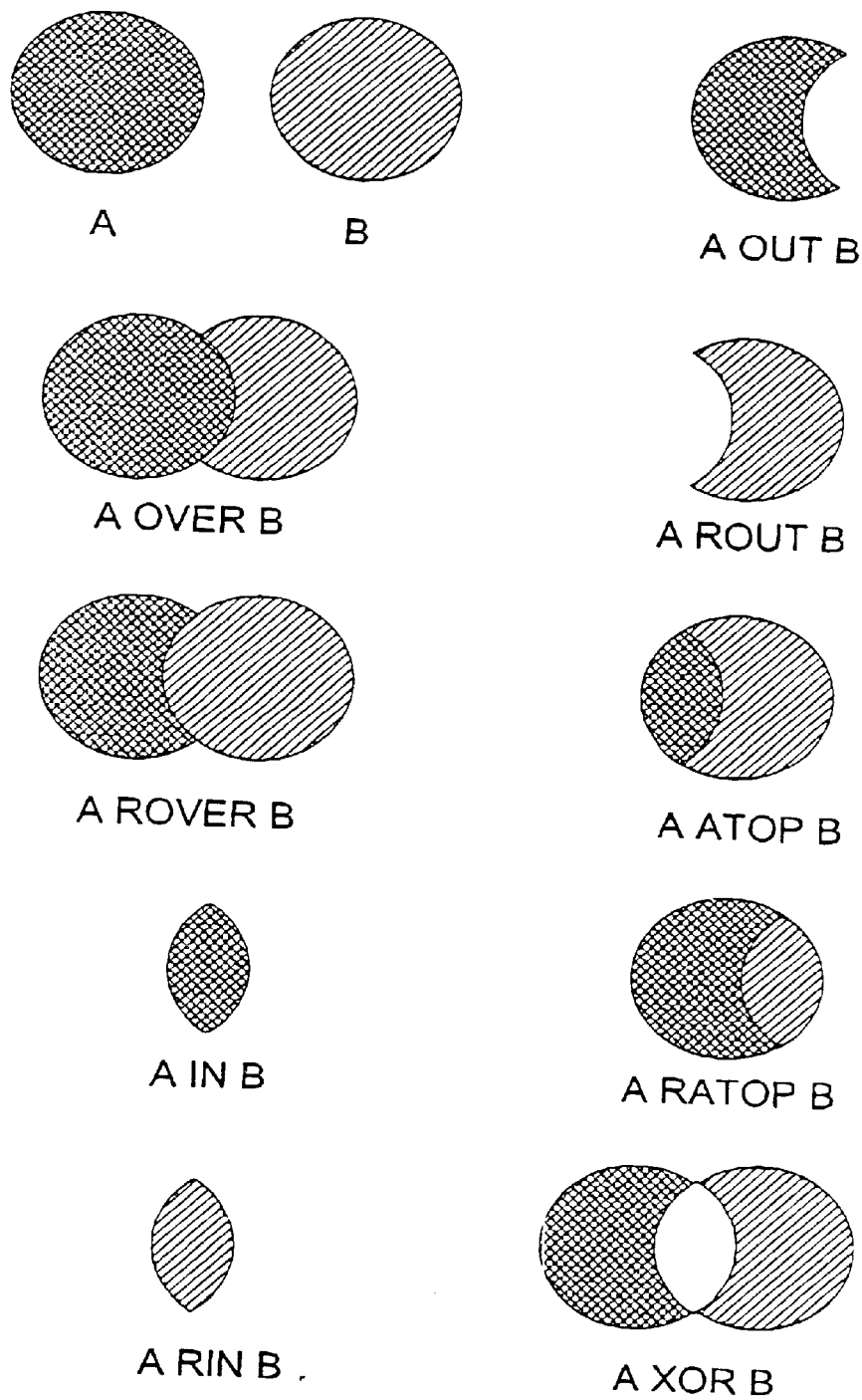
FIG. 2 depicts the result of a variety of compositing operators useful with the present invention.

Where reference is made in any one or more of the accompanying drawings to steps and/or features, which have the same reference numerals, those steps and/or features have for the purposes of this description the same function(s) or operation(s), unless the contrary intention appears.

Some portions of the detailed description that follows are explicitly or implicit presented in terms of algorithms and symbolic representations of operations on data within a computer memory (ie. computer code). These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usable, to refer to these signals as bits, values, elements, symbols, characters, terms, numbers, or the like.

It should be borne in mind, however, that all of these and similar terms are to be associated with the appropriate physical quantities. Unless specifically stated otherwise as apparent from the following discussions, it is appreciated that throughout the present description, discussions utilising terms such as "processing", "computing", "generating", "creating", "operating", "communicating", "rendering", "providing", and "linking" or the like, refer to the action and processes of a computer system, or similar electronic device, that manipulates and transforms data represented as physical (electronic) quantities within the computer system's registers and memories into other data similarly represented as physical quantities within the computer system memories or registers or other such information storage, transmission or display devices.

Figure 7:
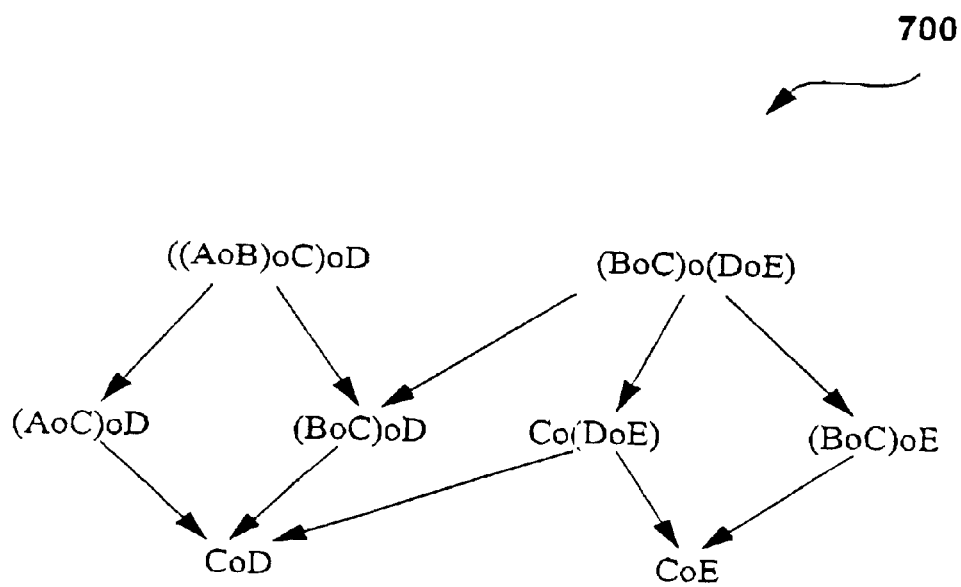
FIG. 7 shows the secondary dependency Dag associated with the region group of FIG. 6.

The preferred embodiment is a method of creating a series of images, which manages secondary dependencies of regions in a more efficient manner than the prior art. The preferred embodiment creates contents labels that represent either leaf node regions or the composition of two other contents labels. The preferred embodiment manages the reference counting of contents labels and provides a means for determining if there exists a contents label which represents the composition of two other contents labels. The preferred embodiment damages contents labels by preferably adding entries to a damage hash table. The preferred embodiment utilises secondary dependency "Directed Acyclic Graphs" (hereinafter referred to as "Dags") which are stored in every binary node and define the secondary dependency relationship between the contents label created in that node. An example Dag 700 is shown in FIG. 7. Information is provided by the preferred embodiment as to whether a contents label which has the potential to come into existence is damaged in any way, via examination of secondary dependency Dags associated with the contents label. The preferred embodiment also provides information on whether rendering can be avoided by determining the properties of particular compositing operators involved in a rendering operation.

Figure 8:
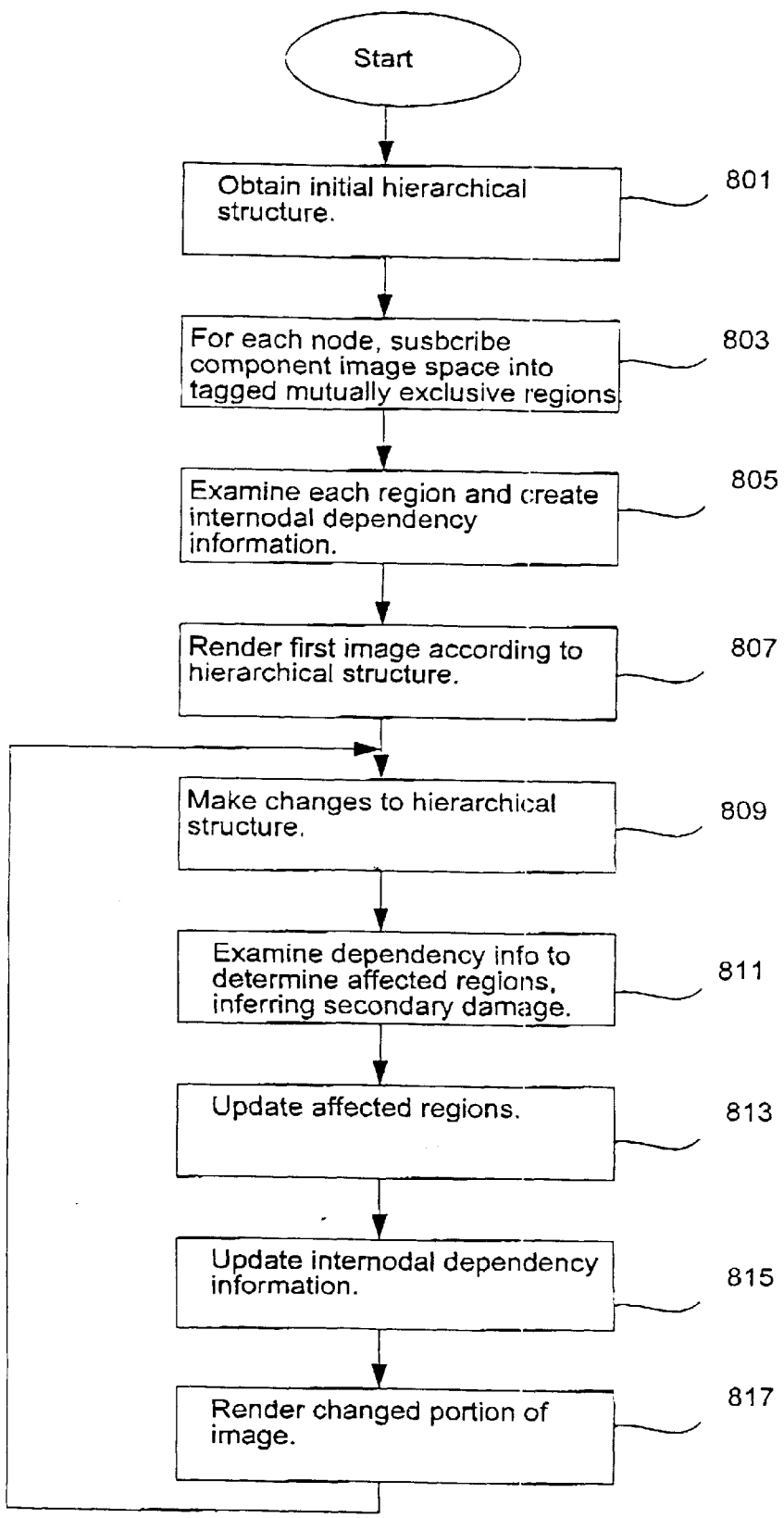
FIG. 8 is a flowchart showing a method of creating a series of images in accordance with the preferred embodiment of the present invention.
Figure 9:
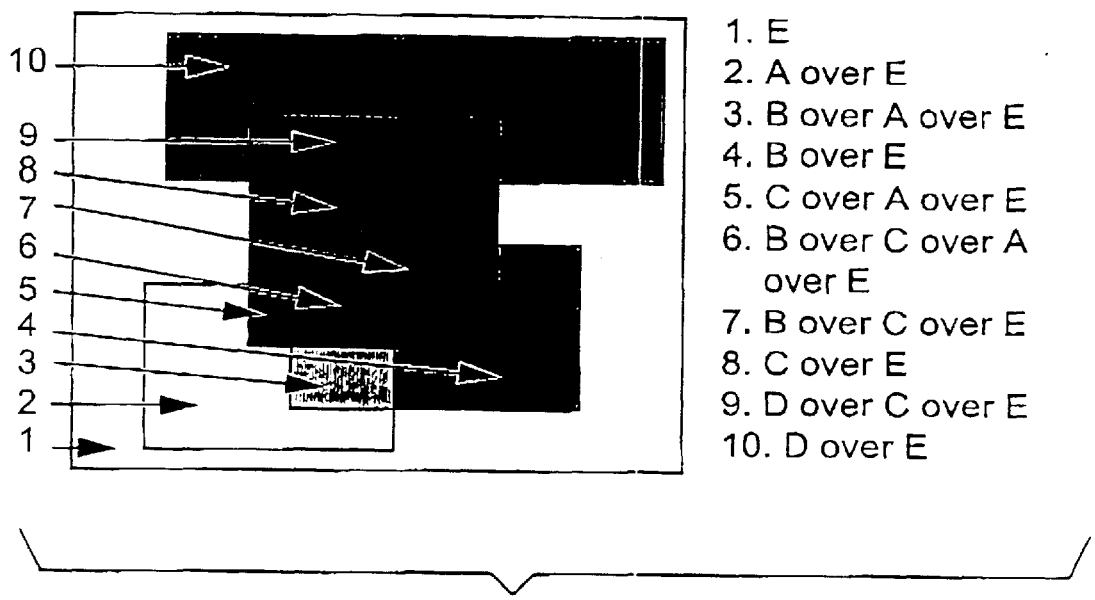
FIG. 9 shows the region subdivision and the respective compositing expressions for a simple compositing tree.

FIG. 8 is a flowchart showing a method of creating a series of images in accordance with the preferred embodiment of the present invention. Each member of the series of images is related to a preceding member. The images are formed by rendering a number of graphical objects to be composited according to a hierarchical compositing tree representing a compositing expression. Each node of the hierarchical compositing tree represents a component of at least one of the images and each of the objects has a predetermined outline. Secondary dependency Dags are preferably stored in every node of the hierarchical compositing tree, as discussed above. The process begins at step 801, where a hierarchical compositing tree representing a first image is accessed. At the next step 803, for each node of the hierarchical compositing tree, the component image space is subdivided into a number of mutually exclusive regions. Each of the mutually exclusive regions is tagged with a contents label in accordance with the preferred embodiment. The process continues at step 805, where each of the mutually exclusive regions is examined and dependency information is created. The data structure of the dependency information and the method for creating it are described in AU-A-47329/99 in conjunction with the description below. At the next step 807, the first image is rendered according to the hierarchical structure. The process continues at step 809, where the image changes resulting in changes to the hierarchical compositing tree. At the next step 811, the dependency information is examined to determine which regions have been affected by the changes to the hierarchical compositing tree. In accordance with the preferred embodiment, rather than generating every possible contents label in order to determine secondary damage, the preferred embodiment infers secondary damage for a region (or possibly regions) from the primary damage of regions related to the damaged region. The preferred embodiment examines the secondary dependency Dag or Dags associated with the region. The inference of secondary damage and examination of the Dags will be described in more detail below. The process continues at the next step 813, where affected regions are updated. The updating of the affected regions is described in AU-A-47329/99 in conjunction with the description below. At the next step 815, the dependency information is updated to reflect the changes to the hierarchical compositing tree. The process continues at step 817, where the changed portions of the first image are rendered according to the hierarchical compositing tree to produce the updated image. Only those regions affected by the change are rendered at step 817.

In accordance with the preferred embodiment, a contents label is preferably configured as a pointer to a properties structure, preferably represented by the tag CL_Properties. The properties structure CL_Properties contains data defining the properties of the region represented by the contents label as well as how the contents label relates to other contents labels. Alternatively, the contents label can be configured as all index into an array of contents label property structures. However, the preferred contents label configuration is very efficient in that it minimises indirection when accessing contents label properties structures. The properties structures are preferably allocated in large chunks, represented by the tag CL_PropertiesChunk in accordance with the preferred embodiment, to prevent fragmentation. Once a chunk has been allocated, all of the property structures that the chunk contains are threaded into a free list, which is attached to an instance associated with the contents label. The instance is represented bar the tag CL_Instance, in accordance with the preferred embodiment. When the new contents label is required, the first element of the free list is used. When the contents label is no longer required, the properties structure is added to the free list associated with the instance.

The above description outlined the method for creating a contents label to represent a leaf node region. However, in accordance with the preferred embodiment, it is possible to create a "composite contents label" which represents the composition of two other existing contents labels. This 3-to-1 mapping (i.e. 2 contents labels plus a compositing operator) is achieved by having the CL_Instance contain a hash table, consisting of CL_HashItem structures, which is keyed by a contents label pair and a compositing operator which maps to a single contents label.

When a contents label is created in accordance with the preferred embodiment, a primary dependency list associated with the created label is empty, and it is a member of no secondary dependency Dags. Composite contents labels can be members of a Dag. For a leaf node contents label, whether it is opaque or not is a direct result of the data provided by the leaf node. On the other hand, when a composite contents label is created, whether or not the composite label represents opaque content is dependent on the opaqueness properties of the ancestors of the label and the compositing operator of the composite contents label.

Each contents label preferably contains an array containing the leaf node contents labels contributing to it. For a leaf node the array is of size 1. For composite contents labels, the size of the array is dependent on the depth-complexity. The array is used to speed up the operations needed to position a contents label within a secondary dependency Dag.

A reference counting method is used to manage contents labels in accordance with the preferred embodiment. The preferred reference counting method does no: necessitate the creation of contents labels which do not exist simply so that the contents labels can be damaged. Preferably, contents labels have a reference count of one when they are created. For leaf node contents labels, the associated reference can be thought of as being from the entry in a structure of the contents label of the particular leaf node. The associated reference of a contents label associated with a leaf node is represented by the tag LA_ContentInfo, in accordance with the preferred embodiment. For composite contents labels, this initial reference can be thought of as being from an intersection region in a region group. References, can come from the following sources in accordance with the preferred embodiment:

(i) from being presented in an LA_ContentInfo structure. This occurs only for leaf contents labels, and only one reference from this source is possible;

(ii) from a descendent contents label. Each composite contents label increments the reference count of both its ancestors, to ensure that neither is deleted before file descendent itself is deleted;

(iii) from a region above the current region, represented by a tag NA_Region in a group of regions represented by NA_RegionGroup in accordance with the preferred embodiment, in the compositing tree. Multiple references are possible from this source;

(iv) from a contents label Dag node, represented by the tag CL_DagNode in accordance with the preferred embodiment, in a contents label Dag, represented by the tag CL_SecDepDag, in accordance with the preferred embodiment. Since a contents label can be represented in multiple secondary dependence Dags, multiple references are possible from this source;

(v) from a damage hash item, represented by the tag DH_Item in accordance with the preferred embodiment, in a damage hash table, represented bad the tag DH_DamageHash in accordance with the preferred embodiment. Only one reference is possible per damage hash table;

(vi) from a display partitioning item, represented by the tar DP_Item in a display partitioning represented by the tag DP_DestPartitioning, in accordance with the preferred embodiment. Only one reference is possible per display partitioning; and (vii) from an entry in a binary node associated with a contents label, represented by the tag CT_BinaryNode in accordance with the preferred embodiment, unlinked contents labels array.

Once a reference count of a contents label falls to 0, the primary dependencies array associated with the contents label will be empty, and the contents label will not be a member of any secondary dependency Dags. The contents label having a reference count of 0 can then be added to the list of free contents labels associated with an instance.

It is necessary, in accordance with the preferred embodiment, to be able to determine whether or not there is an existing contents label which represents the composition of two other contents labels. Preferably, a lookup is performed to determine this by constructing a key using the contributing contents labels and operator, and determining if a matching entry exists in the hash table associated with the contents label. If so, the contents label representing the composition is preferably generated. Otherwise, NULL is generated.

Damaging a contents label is preferably implemented by placing an item into a damage hash table for each contents label affected by the damage. Each affected contents label can be damaged with boundary damage (primary/secondary), contents damage and integer translation damage. The contents labels affected by primary boundary damage, contents damage and integer translation damage are preferably determined by recursively damaging the primary dependencies of the contents label. If a contents label is being damaged with primary boundary damage, then contents labels related to the contents label in a secondary dependency relationship will be affected by secondary boundary damage. Essentially, if the contents label is a peak of a secondary dependency Dag (i.e. the contents label has no parents in the Dag), then all the other contents labels in the Dag reachable from the contents label are damaged with secondary damage. Integer translation damage can only be applied if primary boundary and contents damage is also applied.

Figure 3:
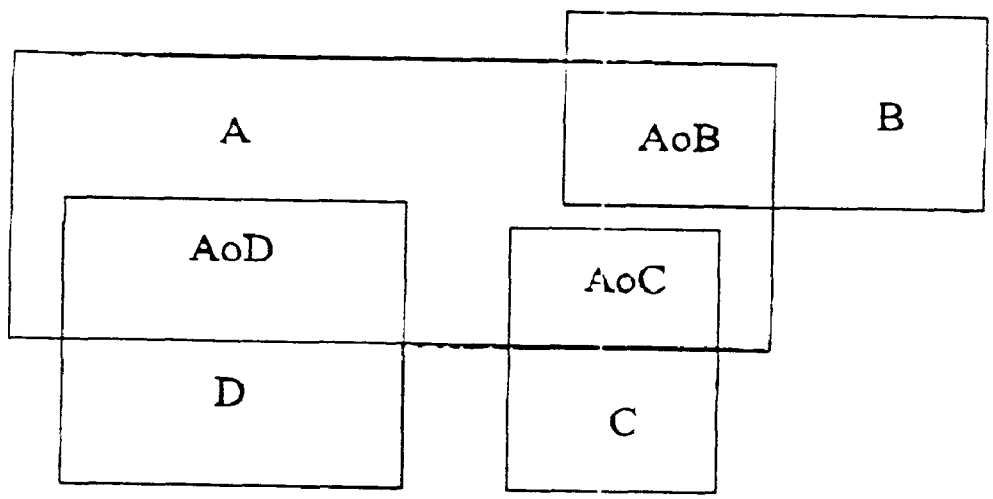
FIG. 3 shows a difference region being secondary boundary damaged as a result being an ancestor of an intersection region.

When a new intersection region is created in a region group, the two contents labels which contributed to the new intersection region (i.e. the ancestors of the intersection region) are preferably stored in the properties structure of the near composite contents label. As well as representing the ancestors of new content's label, these contents labels also represent possible difference regions within the region group. The boundary of the difference region is affected by both the boundary contributed by the difference regions equivalent region lower in the tree, as well as the boundaries of any regions intersecting it. When the boundaries of one of the intersecting regions changes (i.e. the contents label associated with the intersection region has primary boundary damage), the difference region will be secondary boundary damaged as a result of being an ancestor of the intersection region. For example, as seen in FIG. 3, "A" is a difference region, which is intersected by "B", "C" and "D". The difference region is referred to as an ancestor of AoB, AoC, AoD. Thus, if B, C or D move, then A will be appropriately damaged.

As discussed above, rather than generating every possible contents label (which can exist given the existence of a "peak" contents label) in order to determine secondary damage, the preferred embodiment infers secondary damage for a contents label (or possibly contents labels) from the primary damage of contents labels related to the damaged contents label. A contents label can be said to have secondary damage, in accordance with the preferred embodiment, if either of the following criteria are met:

(i) the contents label is the direct ancestor of a contents label with primary damage. This is the only way a leaf node contents label can be secondary damaged; or (ii) for a composite contents label (i.e a op b), there exists a contents label (A op B) which is primary damaged, where every leaf node contents label contributing to 'a' also contributes to 'A'. Similarly, every leaf node contents label contributing to 'b' must also contribute to 'B'. (A op B) is termed a "superset" of (a op b), as well as possibly a superset of a large number of other contents labels. Alternatively, (a o b) is a subset of (A op B).

To determine whether or not a particular contents label has secondary damage, a search can be performed in accordance with the preferred embodiment to determine a matching "superset" contents label with primary damage. In this connection, it is preferable not to undertake a brute force search of primary-damaged contents labels. Therefore, the preferred embodiment assumes that a composite contents label's "superset" contents label must be a contents label (attached to an intersection region) which must have been created within the same node as the contents label itself. This assumption limits the search space considerably. Each region group preferably contains a contents label managed secondary dependency Dag which defines the secondary dependency relationship between the contents label created within that node. Those contents labels in the Dag which have no parents are referred to as peaks, as discussed above. Peaks are the superset of a mountain of possible contents labels.

In the prior art example implementation discussed above, a contents label was implemented as an index into an array of CL_Properties structures. To avoid this indirection, in accordance with the preferred embodiment, the contents label is configured as a pointer directly to a CL_Properties structure. Further, a variable, represented by the tag CL_Property*, is preferably referred to as a contents label, since the terms are completely interchangeable.

Each Dag node preferably contains two linked lists of Dag node references, represented by the tag CL_DagNodeRef in accordance with the preferred embodiment. One represents the children of the Dag node, the other represents the parents of the Dag node. Linked lists are preferably used since secondary dependency Dags are expected to require considerable editing during their lifetimes. In addition, the use of linked lists allows new elements to be added to the front of the list whilst the remainder of the list is being traversed. The structure of CL_DagNodeRef is shown in Appendix 1.

A node representing the position of a contents label in a secondary dependency Dag is represented by the tag CL_DagNode in accordance with the preferred embodiment. Each Dag node is preferably attached to a single contents label. Preferably, Dag nodes are decoupled from the contents labels themselves since it is possible for a contents label to be a member of a number of Dags at the same time. The structure of CL_DagNode is shown in Appendix 1.

The structure representing a secondary dependency Dag is represented by the tag CL_SecDepDag, in accordance with the preferred embodiment. CL_SecDepDag stores the entry points into the Dag. Any Dag node without any parents is considered an entry point, and is referred to as the peak as discussed above. The structure of CL_SecDepDag is shown in Appendix 1.

The structure containing the properties of a contents label is represented by the tag CL_Properties, in accordance with the preferred embodiment. The structure of CL_Properties is shown in Appendix 1.

An item in the hash table associated with the CL instance is preferable represented by the tag CL_HashItem. A single item maps two contents labels plus an operator to another contents label. Each composite contents label has such an entry in the hash table. The structure of CL_HashItem is shown in Appendix 1.

In order to reduce memory fragmentation, CL_Properties structures are preferably allocated in large chunks (e.g. of several hundred or so), represented by CL_PropertiesChunk in accordance with the preferred embodiment. When a chunk is created, all of its members are preferably linked into a free list, which is attached to the CL_Instance. To obtain a new properties structure, an item is unlinked from the free list. Conversely, contents label properties structures whose reference count falls to 0 can be added to the free list. The structure of CL_PropertiesChunk is shown in Appendix 1.

Again, in order to reduce memory fragmentation, the CL_DagNodeRef structures are preferably allocated in large chunks (i.e. of several hundred or so). These chunks are represented by the tag CL_DagNodeRefChunk in accordance with the preferred embodiment. When a chunk of CL_DagNodeRef structures is created, all of its members are linked into a free list which is attached to the CL_Instance. To obtain a new Dag node reference, an item is unlinked from the free list. Conversely, Dag node references which are no longer required can be added to the free list. The structure of CL_DagNodeRefChunk is shown in Appendix 1.

Yet again, in order to reduce memory fragmentation, CL_DagNode structures are preferably allocated in large chunks (e.g. of several hundred or so). When a chunk of CL_DagNode structures is created, all its members are linked into a free list which is attached to the CL_Instance. The structure of CL_DagNodeChunk is shown in Appendix 1.

The CL_Instance structure preferably stores all of the data required for contents label managment. This data preferably includes, the composite contents label hash table, chunk pointers and free list pointers. The structure of CL_Instance is shown in Appendix 1.

An enum, represented by the tag enum CL_BoundaryDamage in accordance with the preferred embodiment, is preferably utilised to describe the three possible states of boundary damage. The structure of enum CL_BoundaryDamage is shown in Appendix 1.

The pseodo-code listed below outlines the configuration of source code in accordance with the preferred embodiment. All of the structures (e.g. CL_Instance) referred to in the source code are described in Appendix 1. The source code can be divided into two separate parts as shown in the pseudo code; one part (i.e "Internel Routines") for carrying out the image creation methods; and another part (i.e. "Interface Routines") to manage the user interface between the latter and the user. These two sections are further divided into subroutine functions as will be outlined below.

The pseudocode below omits tests for null pointers and values in range. Parameters to functions called are not noted when they are the same as or a subset of the parameters of the calling function. Further, error handling details have been omitted. Some points have been noted in the comments.

2.0 Interface Routines 2.1 CL_init begin CL_init
    In the provided instance structure, initialise the properties structure and dag structure
        free lists (and their associated chunks) to be NULL initially. Also allocate memory
        for the initial state of the composite hash table.
    Get a pointer to the CL_Instance part of the OPS_Instance argument.
    Use calloc to allocate an array of CL_HashItem structures (say 512 elements
        initially) and clear the allocated memory to zero.
    In the instance initialize:
        cli_NextDebugCLab ← 1. (debug builds only)
        cli_HashNels ← 0.
        cli_HashLength ← 512(say).
        cli_HashTable ← previously allocated array.
        cli_PropChunks ← NULL.
        cli_PropFreeList ← NULL.
        cli_DagNodeRefChunks ← NULL.
        cli_DagNodeRefFreeList ← NULL.
        cli_DagNodeChunks ← NULL.
        cli_DagNodeFreeList ← NULL.

2.2 CL_end begin CL_end
    Free the hash table array as well as any chunks existing in the properties structure and
        dag structure chunk lists.
    In debug builds, assert that every properties structure in every chunk has no surviving
        references.
    Free the memory pointed to by cli_CLHashTable.
    Free all the chunks in the linked list pointed to be cli_PropChunks.
    Free all the chunks in the linked list pointed to by cli_DagNodeRefChunks.
    Free all the chunks in the linked list pointed to by cli_DagNodeChunks.
end.

2.3 CL_new begin CL_new
    This routine simply calls the internal routine for properties structure creation, after
        having constructed the appropriate flags. The returned properties structure is cast
        to become a CL_ContentsLabel. Therefore, this function could possibly be inline.
    if opaque then
        flags ← CL_PF_OPAQUE.
    else
        flags ← 0.
    end.
    call cl_new, passing flags, obtaining clab.
    in the properties structure pointed to by clab set:
        clp_Ancestors [0] ← NULL.
        clp_Ancestors [1] ← NULL.
        clp_LeafSelfPtr ← clab.
        clp_LeftClabsLen ← 1.
        clp_RightClabsLen ← 0.
        clp_LeafClabs ← pointer to clp_LeafSelfPtr;
    return result of cl_new, cast to a CL_ContentsLabel.
end.

2.4 CL_new_composite

Table 1, below, is used by the function CL_new_composite to determine the opacity and rendering optimisation properties for any contents label it creates. Table 1 maps the opacity properties of the left and right ancestors of the contents label to the required opacity rendering optimisation properties for the new contents labels. (NB - No reverse operators are shown, they may be derived by transposing their equivalent non-reversed operator). The Key in Table 1 is outlined as follows:

O - CL_PF_OPAQUE;
T - CL_PF_TRANSPARENT;
P - Neither 1 nor 2;
N - neither CL_PF_RENDOPT_LEFT nor CL_PF_RENDOPT_RIGHT;
L - CL_PF_RENDOPT_LEFT;
R - CL_PF_RENDOPT_RIGHT;
B - CL_PF_RENDOPT_LEFT and CL_PF_RENDOPT_RIGHT.

TABLE 1

| Left | Right | Over | In   | Out  | Atop | Upon | Xor  | And  | Plus |
|------|-------|------|------|------|------|------|------|------|------|
| O    | O     | O, L | O, L | T, N | O, L | O, B | T, N | O, B | O, B |
| O    | P     | O, L | P, B | P, B | P, B | P, B | P, B | P, B | O, B |
| O    | T     | O, L | T, N | O, L | T, N | T, N | O, L | T, N | O, L |
| P    | O     | O, B | P, L | T, N | O, B | O, B | P, B | P, B | O, B |
| P    | P     | P, B | P, B | P, B | P, B | P, B | P, B | P, B | P, B |
| P    | T     | P, L | T, N | P, L | T, N | T, N | P, L | T, N | P, L |
| T    | O     | O, R | T, N | T, N | O, R | O, R | O, R | T, N | O, R |
| T    | P     | P, R | T, N | T, N | P, R | P, R | P, R | T, N | P, R |
| T    | T     | T, N | T, N | T, N | T, N | T, N | T, N | T, N | T, N |

The pseudo code for the subroutine CL_new_composite function is shown below:
begin CL_new_composite
    The hash table is grown straight away, regardless of whether a matching contents label already exists. This means that in some cases the growing can be performed early., however this isn't a problem.
    if adding a contents label would make the hash table too full then
      grow the hash table, removing any unused elements.
    end.
    A check is performed to see if a contents label representing the required composition already exists. If it does, a pointer is returned to the properties structure. Otherwise, a new properties structure and hash table entry will need to be generated.
    h ← hash of left, right and op.
    while cli_HashTable [h] ->clhi_CLKeys [0] isn't NULL do
      if left, right and op equal their equivalent hash item keys then
        if cli_HashTable [h] ->clhi_Result isn't NULL then
          return cli_HashTable [h] ->clhi_Result.
        else
          break.
        end.
      end.
      Increment h.
      if h has gone off the end of the hash table then
        h ← 0.
      end.
    end.
    There is no existing contents label representing the mapping. Therefore a contents label representing the mapping is created. First, the opaqueness properties and rendering optimisations of the new contents label is determined. These are dependent on the opaqueness properties of the two contributing contents labels and the compositing operator.
    flags ← lookup in table provided previously according to the opacity properties of left and right, as well as op.
    call cl_new passing flags, obtaining clab.
    In the properties structure pointed to by clab set:
      clp_Ancestors [0] ← left.
      clp_Ancestors [1] ← right.
      clp_Op ← op.
      clp_DagNodes ← NULL.
      clp_LeftCLabsLen ← left's clp_LeftCLabsLen − left's clp_RightCLabsLen.
      clp_RightCLabsLen ← right's clp_LeftCLabsLen + right's -continued

```
        clp_RightCLabsLen.
        clp_LeafCLabs ← call malloc for an array of (clp_LeftClabsLen −
            clp_RightCLabsLen) CL_Property pointers.
        copy all the elements in left's clp_LeafCLabs array into the first
            clp_LeftCLabsLen elements of clp_LeafClabs.
        copy all the elements in right's clp_LeafClabs array into the last
            clp_RightCLabsLen elements of clp_LeafClabs.
    Add clab to clp_Ancestors [0]'s primary dependencies (growing the array if
        necessary).
    call CL_inc_ref_clab passing left.
    Add clab to clp_Ancestors [1]'s primary dependencies (growing the array if
        necessary).
    call CL_inc_ref_clab passing right.
    A new contents label has now been created. Now the hash table entry has to be updated
        and indexed by h to map to this contents label.
    In cli_HashTable [h] set:
        clhi_CLKeys ← left and right.
        clhi_OpKey ← op.
        clhi_Result ← clab.
    Increment cli_HashNels.
end.
```

2.5 CL_inc_ref_clab

```
begin CL_inc_ref_clab
    Increments the reference count of a contents label.
    increment clab's clp_nRefs.
end.
```

2.6 CL_dec_ref_clab

```
begin CL_dec_ref_clab
    Decrements the reference count of a contents label. If the reference count falls to 0, it
        performs any necessary cleanups and adds the properties structure to the free list.
    assert that clab's clp_nRefs is at least 1.
    decrement clab's clp_nRefs.
    if clab's reference count has fallen to 0 then
        in debug builds, assert that the primary dependency array contains only NULL
            pointers.
        free the primary dependency array (clp_PriDeps).
        if clab is a binary node (clab's clp_Ancestors [0] isn't NULL) then
            assert that clab's clp_DagNodes is NULL.
            Remove clab from the left ancestor's primary dependencies.
            call CL_dec_ref_clab passing clab's clp_Ancestors [0].
            Remove clab from the right ancestor's primary dependencies.
            call CL_dec_ref_clab passing clab's clp_Ancestors [1].
            free the leaf contents labels array (clp_LeafCLabs).
            Now, make the hash table entry mapping to the dec-reffed contents label
                "unused".
            h ← hash of left, right and op.
            while cli_HashTable [h] ->clhi_CLKeys [0] isn't 0 do
                if left, right and op equal their equivalent hash item keys then
                    cli_HashTable [h] ->clhi_Result ← NULL, to indicate that the
                        hash table entry is now unused. (Note - This is not the same as it being
                        empty).
                end.
                Increment h.
                if h has gone off the end of the hash table then
```

-continued

2.6 CL_dec_ref_clab

```
            h ← 0.
         end.
      end.
   end.
  end.
end.
```

2.7 CL_lookup_composite

```
begin CL_lookup_composite
    This function searchs the hash table for an item which represents a mapping of the 3
        provided keys to a contents label.
    h ← hash of left, right and operation.
    while cli_HashTable [h] ->clhi_CLKeys [0] isn't NULL do
        if left, right and operation equal their equivalent hash item keys then
            if cli_HashTable [h] ->clhi_Result is non-NULL then
                return cli_HashTable [h] ->clhi_Result, cast to a
                    CL_ContentsLabel.
            else
                return NULL.
            end.
        end.
        Increment h.
        if h has gone off the end of the hash table then
            h ← 0.
        end.
    end.
    return NULL.
end.
```

2.8 CL_damage

```
begin CL_damage
    This function simply calls the recursive internal routine which does all the actual work.
        This function also asserts to check that only the four possible input combinations
        are actually passed.
    assert (not primary_boundary_damage and contents_damage and not
        integer_translation) or (primary_boundary_damage and not
        contents_damage and not integer_translation) or
        (primary_boundary_damage and contents_damage and not
        integer_translation) or (primary_boundary_damage and
        contents_damage and integer_translation)
    return call cl_damage_recurse
        (
            damage_hash,
            clab,
            NULL,
            primary_boundary_damage ? CL_BD_PRIMARY : CL_BD_NONE.
            contents_damage,
            integer_translation,
            delta
        ).
end.
```

2.9 CL_check_potential_clab_for_damage

```
begin CL_check_potential_clab_for_damage
    Checks to see if a contents label which currency doesn't exist has damage. If it does,
        then it could come into existance and needs to be checked.
    assert, by calling CL_lookup_composite, that a contents label representing left
        op right doesn't currently exist.
    If either contributing contents label has primary damage, then this potential contents
        label must also be damaged.
    call DH_lookup passing damage_hash and left, obtaining dhi.
```

-continued

2.9 CL_check_potential_clab_for_damage if dhi indicates that left has primary boundary damage then
      return TRUE.
    end.
    call DH_lookup passing damage_hash and right, obtaining dhi.
    if dhi indicates that right has primary boundary damage then
      return TRUE.
    end.
    Neither contributing contents label has primary damage. This means it is necessary to check for the possibility that the potential contents label will be created with secondary damage. This is checked by checking to see if the potential contents label is a subset of any primary damaged peak in the dag of the binary node in which this contents label is being created.
    for each peak (peak) in dag do
      call DH_lookup passing damage_hash and peak, obtaining dhi.
      if dhi indicates that peak doesn't have primary damage then
        continue.
      end.
      if the potential contents label (left op right) is a subset of peak then
        return TRUE.
      end.
    end.
end.

2.10 CL_init_dag begin CL_init_dag
    Called to initialise a secondary dependency dag.
    in the structure pointed to by dag set:
      cdag_Peaks ← NULL.
      cdag_TravCount ← 0.
    end.

2.11 CL_add_clab_to_dag begin CL_add_clab_to_dag
    Called to add a contents label (really a dag node linked to a contents label) to a secondary dependency dag.
    For each dag node (dag_node) in clab's clp_DagNodes linked list do
      if dag_node's cdn_Dag equals dag then
        A dag node representing this contents label already exists within this dag. It must be hanging around pending deletion.
        assert that dag_node's cdn_Remove boolean is TRUE.
        dag_node's cdn_Remove ← FALSE.
        return.
      end.
    end
    if cli_DagNodeFreeList is NULL then
      call cl_add_dag_node_chunk_to_free_list.
    end.
    Unlink the first item from cli_DagNodeFreeList, obtaining dag_node.
    In dag_node initialise:
      cdn_CLab ← clab.
      cdn_TravStamp ← 0.
      cdn_Remove ← FALSE.
      cdn_Dag ← dag.
      cdn_Parents ← NULL.
      cdn_Children ← NULL.
    increment dag's cdag_TravCount.
    flags ← (SUPERSET, SUBSET).
    for each peak (peak) in dag's cdag_Peaks linked list do
      if clab and peak aren't possibly related (involves calling cl_possibly_related to determine that there are elements in common on both the left and right of peak and clab) then
        continue.
      end.
      if flags contains SUPERSET and peak is a subset of clab (involves calling cl_subset) then

2.11 CL_add_clab_to_dag add a reference to peak to the front of dag_node's cdn_Children linked
           list.
        assert that peak's cdn_Parents list is NULL.
        add a reference to dag_node to the front of peak's cdn_Parents linked list.
        remove the reference to peak from the dag's cdag_Peaks linked list, adding
           the reference to the front of the cli_DagNodeRefFreeList.
        clear SUBSET from flags.
        call cl_traverse_dag_recurse passing dag, peak and NULL (this is
           simply to mark the nodes reachable from peak as visited).
    else if flags contain SUBSET and clab is a subset of peak then
        call cl_add_clab_to_dag_recurse_superset_subset passing dag.
           peak and dag_node.
        clear SUPERSET from flags.
    else if flags contains SUPERSET then
        call cl_add_clab_to_dag_recurse_superset passing dag, peak and
           dag_node).
    end.
  end.
  if flags contains SUPERSET then
    add a reference to dag_node to the front of dag's cdag_Peaks linked list, by
        obtaining a ref from the free list with all that this involves.
  end.
  add dag_node to the front of clab's clp_DagNode linked list.
  call CL_inc_ref_clab passing clab.
end.

2.12 CL_delete_clab_from_dag begin CL_delete_clab_from_dag
    Called to remove a content label (really a dag node pointing to a contents label) from
        a secondary dependency dag.
    dag_node ← clab's clp_DagNodes.
    while dag_node isn't NULL and dag_node's cdn_Dag doesn't equal dag do
      dag_node ← dag_node's cdn_Next.
    end.
    if dag_node is NULL then
      assert FALSE.
      return.
    end.
    assert that dag_node's cdn_Remove flag is FALSE.
    dag_node's cdn_Remove ← TRUE.
    if dag_node has at least one parent (dag_node's cdn_Parents linked list is non-
        NULL) then
      return.
    end.
    remove dag_node from dag's linked list of peaks (cdag_Peaks).
    call cl_delete_dag_node_from_dag passing dag and dag_node.
end.

2.13 CL_rendering_optimisation begin CL_rendering_optimisation
    This function returns an enumerated type indicating whether or not the effect of a full
        render of the content can be obtained by simply using the pixel data of either
        ancestor (or even no pixel data at all). This information is permanently stored in
        a contents label's properties.
    return flags in clab converted to the enumerated type.
end.

2.14 CL_get_ancestors begin CL_get_ancestors
  return a pointer to clab's 2-element cpi_Ancestors array.
end.

3.0 Internal Routines

3.1 cl_new begin cl_new
  This function simply unlinks the first element from the properties structure free list and sets its reference count to 1, and performs routine initialisation. If the free list is empty, a new chunk is allocated.
  parameters
    flags : int
  if cli_PropFreeList is NULL then
    call cl_add_prop_chunk_to_free_list.
  end.
  Unlink the first element of cli_PropFreeList.
  In the unlinked properties structure set:
    clp_nRefs ← 1.
    clp_Flags ← flags.
    clp_PriDepsLen ← 0.
    clp_PriDeps ← NULL.
  return the unlinked properties structure.
end.

3.2 cl_damage_recurse begin cl_damage_recurse
  This function is called to recursively damage a contents label and all its primary dependencies. If boundary damage is set then any of a node's secondary dependencies (as determined by dag traversal) are also damaged.
  parameters:
    damage_hash : DH_DamageHash
    clab : CL_Properties *
    from_clab : CL_Properties *
    boundary_damage : CL_BoundaryDamage
    contents_damage : Boolean
    integer_translation : Boolean
    delta : IntXY *
  call DH_ensure_damage passing clab, obtaining dhi, a pointer to a DH_item and item_added, a boolean.
  if item_added (clab was not previously damaged) then
    if boundary_damage is CL_BD_PRIMARY then
      Set DH_IF_PRIMARY_BOUNDARY in dhi's flags.
    else if boundary_damage is CL_BD_SECONDARY then
      Set DH_IF_SECONDARY_BOUNDARY is dhi's flags.
    end.
    if contents_damage then
      Set DH_IF_CONTENTS in dhi's flags.
    end.
    if clab's rendering optimisation is CL_PF_RENDOPT_LEFT then
      set DH_IF_LEFT_REQUIRED in dhi's flags.
    end.
    if clab's rendering optimisation is CL_PF_RENDOPT_RIGHT then
      set DH_IF_RIGHT_REQUIRED in dhi's flags.
    end.
  else
    if boundary_damage is CL_DB_PRIMARY then
      if dhi doesn't have DH_IF_PRIMARY_BOUNDARY set then
        Set DH_IF_PRIMARY_BOUNDARY in dhi's flags.
      else
        boundary_damage ← CL_BD_NONE, to prevent unnecessary recursion.
      end.
    else if boundary_damage is CL_DB_SECONDARY then
      if dhi has no boundary damage flags set then
        Set DH_IF_SECONDARY_BOUNDARY in dhi's flags.

| 3.2 cl_damage_recurse |
|---|

```
            else
                boundary_damage ← CL_BD_NONE.
            end.
        end.
        if contents_damage then
            if dhi doesn't have DH_IF_CONTENTS set then
                Set DH_IF_CONTENTS in dhi's flags.
            else
                contents_damage ← FALSE.
            end.
        end.
    end.
    assert that the DH_IF_LEFT/RIGHT_REQUIRED flags match the rendering
        optimisation of clab.
    if boundary_damage is CL_BD_PRIMARY and clab is a composite contents label
            then
        Primary boundary damage was added to this damage item. Therefore, if the contents
            label is a peak of any dag (ie it has no parent), a dag traversal to secondary
            damage is undertaken to every reachable contents label in that dag. Also,
            secondary damage both ancestors.
        call cl_damage_recurse to add secondary damage to clp_Ancestors [0].
        call cl_damage_recurse to add secondary damage to clp_Ancestors [1].
        for each dag node is a peak in its dag then
            if the dag_node is a peak in its dag then
                increment dag_node's cdn_Dag's cdag_TravCount, because we will
                    be undertaking a traversal of a subgraph.
                call cl_dag_traverse_dag_node_recurse passing dag_node and a
                    pointer to a function which will set secondary boundary damage on the
                    contents label of every dag node encountered during the traversal.
            end.
        end.
    end.
    if dhi doesn't have DHIF_INTEGER_TRANSLATION set and
            integer_translation then
        The caller of this function wants to set integer translation damage for this contents
            label A check must be performed to determine if this is acceptable.
        if from_clab is NULL (translation is not compositing operator dependent) then
            Set DHIF_INT_TRANS in dhi and copy delta.
        else if clab has both CL_PF_RENDOPT_LEFT and CL_PF_RENDOPT_RIGHT
                set then
            if dhi doesn't have DH_IF_POSSIBLE_INT_TRANS set then
                set DH_IF_POSSIBLE_INT_TRANS in dhi's flags.
                copy delta into dhi's dhi_Delta.
                integer_translation ← FALSE.
            else
                clear DH_IF_POSSIBLE_INT_TRANS from dhi's flags.
                if delta is equal to dhi's dhi_Delta then
                    Set DHIF_INT_TRANS in dhi and copy delta.
                else
                    integer_translation ← FALSE.
                end.
            end.
        else if clab has CL_PF_RENDOPT_LEFT set then
            if from_clab is clab's left ancestor then
                Set DHIF_INT_TRANS in dhi and copy delta.
            else
                integer_translation ← FALSE.
            end.
        else if clab has CL_PF_RENDOPT_RIGHT set then
            if from_clab is clab's right ancestor then
                Set DHIF_INT_TRANS in dhi and copy delta.
            else
                integer_translation ← FALSE.
            end.
        end.
    else
        integer_translation ← FALSE.
    end
    if boundary_damage ist CL_BD_PRIMARY or contents_damage or
            integer_translation then
        for all items in clab's primary dependencies array do
```

-continued

---

3.2 cl_damage_recurse call cl_damage_recurse(damage_hash, item's contents label, clab,
    boundary_damage, contents_damage, integer_translation.
    delta).
  end.
 end.
end.

---

3.3 cl_subset

--- begin cl_subset
 Called to determine whether a contents label (or possible contents label) is a subset of
  another contents label.
 parameters:
  left_clabs_len : int
  left_clabs : CL_Properties **
  right_clabs_len : int
  right_clabs : CL_Properties **
  clab2 : CL_Properties *
  if left_clabs_len is greater than clab2's clp_LeftCLabsLen or
   right_clabs_len is greater then clab2's clp_RightCLabsLen then
    return FALSE.
  end.
  i ← 0.
  j ← 0.
  while i is less than left_clabs_len do
   while j is less than clab2's clp_LeftClabsLen and clab2's
    clp_LeafClabs [j] doesn't equal left_clabs [i] do
    increment j.
   end.
   if j equals clab2's clp_LeftClabsLen then
    return FALSE.
   end.
   increment j.
   increment i.
  end.
  i ← 0.
  j ← 0.
  while i is less than right_clabs len do
   while j is less than clab2's clp_RightClabsLen and clab2's
    clp_LeafClabs [j + clab's clp_LeftCLabsLen] doesn't equal
    right_clabs [i] do
    increment j.
   end.
   if j equals clab2's clp_RightClabsLen then
    return FALSE.
   end.
   increment j.
   increment i.
  end.
  return TRUE.
end.

---

3.4 cl_possible_related

--- begin cl_possibly_related
 Called to determine whether or not two contents labels are possibly related. Two
  contents labels are possibly related if both left and right sides have at least one
  contents label in common. This function is used to reduce redundant tree traversal
  during dag contruction.
 parameters:
  clab1 : CL_Properties *
  clab2 : CL_Properties *
  i ← 0.
  while we haven't found a match and i is less than clab1's clp_LeftCLabsLen do
   j ← 0.
   while j is less than clab2's clp_LeftClabsLen do
    if clab1's clp_LeafClabs [i] equals clab2's clp_LeafClabs [j]
     then -continued 3.4 cl_possible_related

```
            set a flag indicating that a match has been found.
            break.
        end.
        increment j.
      end.
      increment i.
    end.
    if a match has not been found then
      return FALSE.
    end.
    i ← 0.
    while we haven't found a match and i is less than clab1's clp_RightCLabsLen
        do
      j ← 0.
      while j is less than clab2's clp_RightClabsLen do
        if clab1's clp_LeafClabs [i + clab1's clp_LeftCLabLen] equals
            clab2's clp_LeafClabs [j + clab1's clp_LeftCLabLen] then
          set a flag indicating that a match has been found.
          break.
        end.
        increment j.
      end.
      increment i.
    end.
    if we haven't found a match then
      return FALSE.
    end.
    return TRUE.
end.
```

3.5 cl_traverse_dag_node_recurse

```
begin cl_traverse_dag_node_recurse
  This function is a recursive function used to traverse a dag from a particular node.
        calling a function at each node encountered. The caller must ensure that the dag's
        traversal count has been incremented since this is the last traversal to ensure that
        all reachable nodes are encountered.
    parameters:
        dag_node : CL_DagNode *
        func : A pointer to a function of type Bool func (CL_DagNode *)
    dag ← dag_node's cdn_Dag.
    dag_node's cdn_TravStamp ← dag's cdag_TravCount.
    if func isn't NULL then
      call func passing dag_node.
    end.
    for each node (child) in dag_node's cdn_Children linked list do
      if child's cdn_TravStamp equals dag's cdag_TravCount (ie the node has
            already been visited in this traversal) then
        continue.
      end.
      call cl_traverse_dag_node_recurse passing dag and func.
    end.
end.
```

3.6 cl_add_clab_to_dag_recurse_superset_subset

```
begin cl_add_clab_to_dag_recurse_superset_subset
    A recursive function called when adding a node to dag. It is possible for dag_node to
        be a superset of some or all of the children, or a subset of some or all of the
        children. dag_node must be a subset of cur_node.
    parameters:
        dag: CL_SecDepDag *
        cur_node : CL_DagNode *
        dag_node : CL_DagNode *
    cur_node's cdn_TravStamp ← dag's cdag_TravCount.
    add_to_cur_node ← TRUE.
    flags ← (SUPERSET, SUBSET).
    for each child (child) in cur_node's cdn_Children linked list do
```

-continued

---
3.6 cl_add_clab_to_dag_recurse_superset_subset
--- if dag_node and child aren't possibly related then
    continue.
   end.
   if flags contains SUPERSET and child is a subset of dag_node then
    if child hasn't already been visited (child's cdn_TravStamp doesn't equal
      dag's cdag _TravCount) then
     add a reference to child to the front of dag_node's cdn_Children
      linked list.
     add a reference to dag_node to the front of child's cdn_Parents linked
      list.
     call cl_traverse_dag_recurse passing dag, child and NULL (this
      is simply to mark the nodes reachable from child as visited).
    end
    remove child from cur_node's cdag_Children linked list, adding the
      reference to the front of the cli_DagNodeRefFreeList.
    remove cur_node from child's cdn_Parents linked list, adding the
      reference to the front of the cli_DagNodeRefFreeList.
    clear SUBSET from flags.
    continue.
   end.
   if child has already been visited then
    continue.
   end.
   if flags contains SUBSET and dag_node is a subset of child then
    call cl_add_clab_to_dag_recurse_superset_subset passing dag.
      child and dag_node.
    clear SUPERSET from flags.
    add_to_cur_node ← FALSE.
   else if flags contain SUPERSET then
    call cl_add_clab_to_dag_recurse_superset passing dag, child
      and dag_node.
   end.
  end.
  if add_to_cur_node then
   add a reference to dag_node to the front of cur_node's cdag_Children
     linked list.
   add a reference to cur_node to the front of dag_node's cdag_Parents linked
     list.
  end.
end.

---
3.7 cl_add_clab_to_dag_recurse_superset
--- begin cl_add_clab_to_dag_recurse_superset
  A recursive function called when adding a node to dag. It is possible for dag_node to
    be a superset of some or all of the children. dag_node cannot be a subset of
    cur_node.
  parameters:
   dag : CL_SecDepDag *
   cur_node : CL_DagNode *
   dag_node : CL_DagNode *
  cur_node's cdn_TravStamp ← dag's cdag_TravCount.
  for each child (child) in cur_node's cdn_Children linked list do
   if clab and child aren't possibly related then
    continue.
   end.
   if child is a subset of dag_node then
    if none of child's parents are subsets of dag_node then then
     A link is only added from dag_node to child if the child has no current parents
      which are subsets of dag_node. This is because if a link was added to
      such a child there would be a link from dag_node both to the child and
      it's parent which is illegal.
     add a reference to child to the front of dag_node's cdn_Children
      linked list.
     add a reference to dag_node to the front of child's cdn_Parents linked
      list.
     call cl_traverse_dag_recurse passing dag, child and NULL (this
      is simply to mark the nodes reachable from child as visited).
    end.
   else
    call cl_add_clab_to_dag_recurse_superset passing dag, child
      and dag_node.

3.7 cl_add_clab_to_dag_recurse_superset

```
        end.
    end.
end.
```

3.8 cl_delete_dag_nodes_from dag

```
begin cl_delete_dag_nodes_from_dag
    This is a recursive function called to delete a dag_node with no parents from a dag. It
        must have the cdn_Remove flag set. If, after the node is deleted at least one of
        its former children now itself has no parents, these are recursively deleted
    parameters:
        dag : CL_SecDepDag *
        dag_node : CL_DagNode *
    assert that dag_node has no parents (dag_node's cdn_Parents array is
        NULL).
    for each child (child) in dag_node's cdn_Children linked list do
        remove the child reference from dag_node's cdn_Children linked list,
            adding the reference to the front of the cli_DagNodeRefFreeList.
        remove the dag_node reference from child's cdn_Parents linked list, adding
            the reference to the front of the cli_DagNodeRefFreeList.
        if child now has no parents then
            if child has the cdn_Remove flag set then
                call cl_delete_dag_nodes_from_dag passing dag and child.
            else
                add a reference to child to the front of dag's cdag_Peaks array.
            end.
        end.
    end.
    remove dag_node from dag_node's cdn_CLab's clp_DagNodes linked list.
    call CL_dec_ref_clab passing dag_node's cdn_CLab.
    add dag_node to the the front of the cli_DagNodeFreeList.
end.
```

The aforementioned preferred methods comprise a particular control flow. There are many other variants of the preferred methods, which use different control flows without departing the spirit or scope of the invention. Furthermore one or more of the steps of the preferred methods may be performed in parallel rather sequential.

4.0 Proof of the Validity of Secondary Dependency Dags

In accordance with the preferred embodiment, all composite contents labels created within a binary region group are placed into a secondary dependency Dag, associated with the binary region group. The positions of contents labels within the Dag are defined by a subset operator. When a peak (i.e. a contents label in the Dag which has no parents) has primary boundary damage, all contents labels in the secondary dependency Dag reachable from the peak are damaged with secondary boundary damage. That is, any regions tagged with contents labels reachable from the peak can be affected. For example, assuming that an object A (not illustrated) is a contents label which is the peak of a secondary dependency Dag. A contents label B (not illustrated) which is a subset of A, has the potential to share some portion of its boundary with the region tagged with A (i.e. the region B can be affected by any change to the boundary of A).

Figure 4:
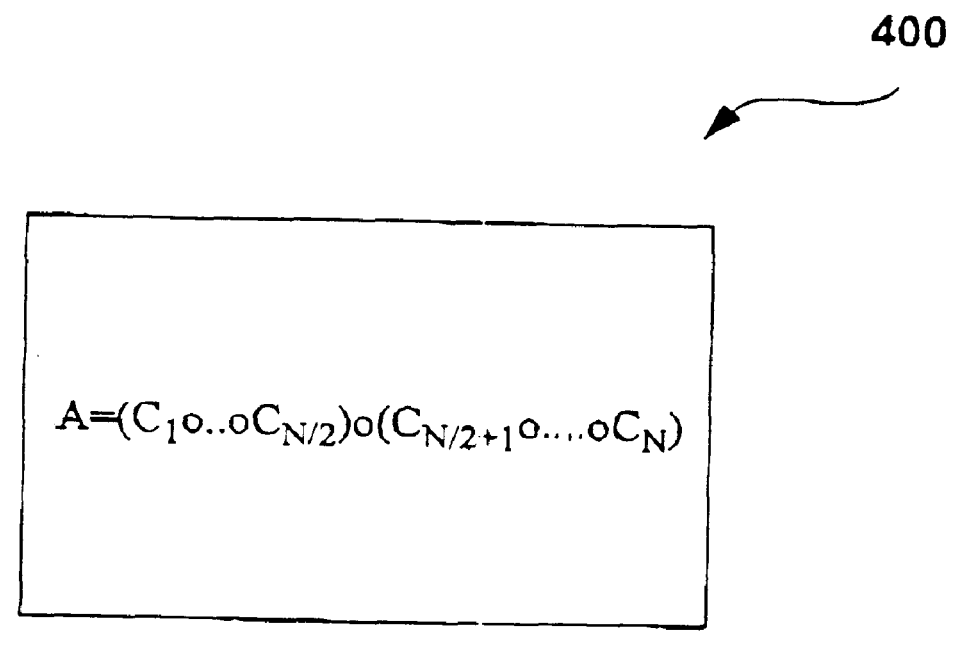
Figure 5:
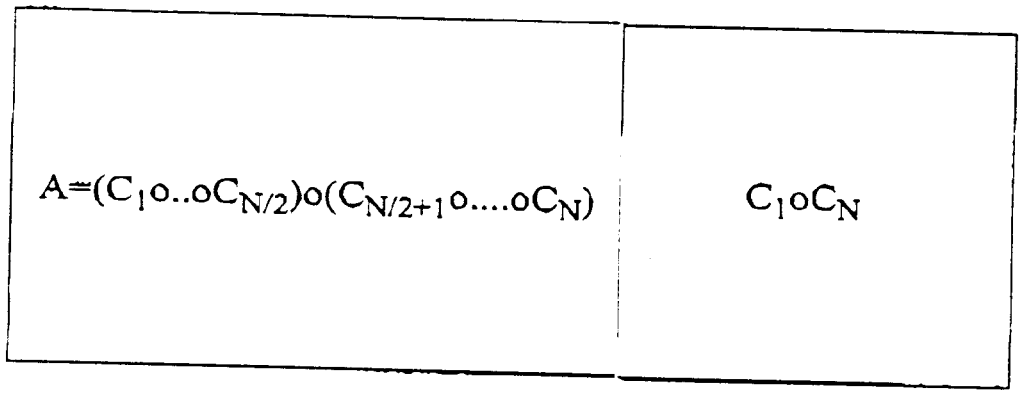
FIG. 5 shows another region group sharing a portion of the top-level region group of FIG. 4.

Further, consider the following example in which N leaf nodes (not illustrated), each of identical shape and position are composited together into a balanced tree (not illustrated). The partitioning of the top-level region group 400 of the balanced tree is shown in FIG. 4, and is tagged as 'A'. If the boundaries of the leaf node regions tagged with $C_1$ (not illustrated) and $C_N$ (not illustrated) were extended, the region group $C_1 o C_N$ (see FIG. 5) would be created. The region group $C_1 o C_N$ abuts the region croup tagged by A as shown in FIG. 5. It should also be noted that $C_1 o C_N$ is a subset of A. Similarly, it is possible to construct scenarios in which a region tagged with any possible subset of the region A can share some portion of the boundary of A by modifying the geometry of the contributing leaf nodes.

The preferred embodiment has insufficient information to determine A whether or not a region tagged with a subset contents label actually shares some portion of the boundary of A. Therefore, when the boundary of A changes (i.e. it is damaged with primary boundary damage), all contents labels which are subsets of A must be secondary damaged. This ensures that the boundaries of their regions are recalculated, and every contents label reachable from A in the secondary dependency Dag is secondary damaged.

Figure 6:
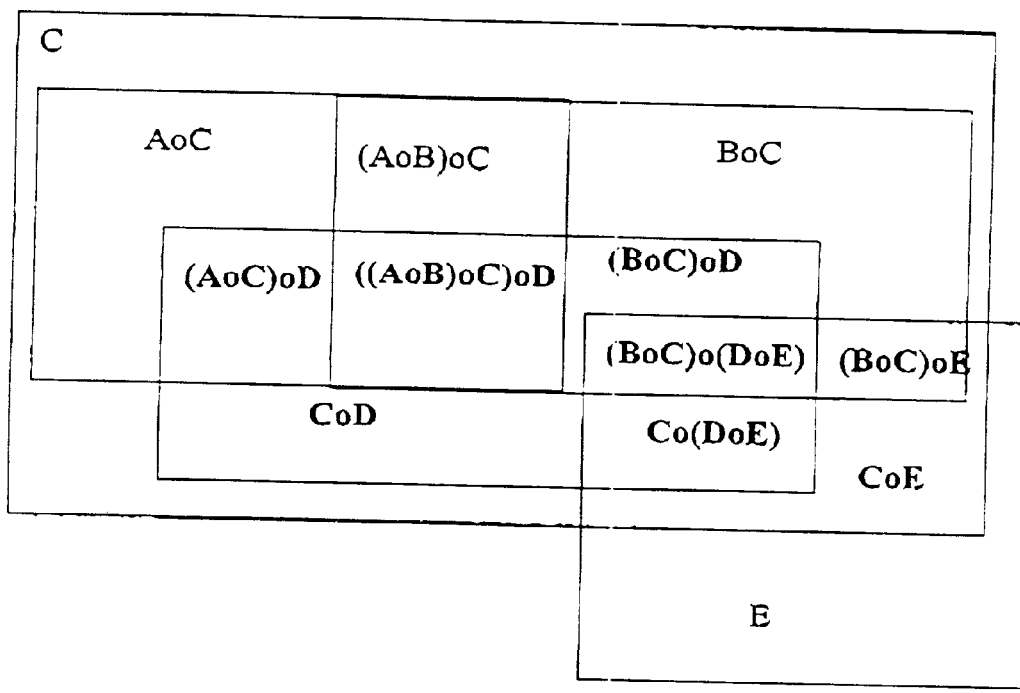
FIG. 6 shows five overlapping objects representing a root region group.

Any region tagged with a contents label B which is not a subset of A cannot share any of the boundary of A, and so cannot be affected by any change to the boundary of A. For B not to be a subset of A, a leaf node contents label must contribute to B which does not contribute to A. If the leaf node contents label is termed CM, then CM does not contribute to A, and A is a peak. Further, the boundary of A is in no way dependant on the boundary of the leaf node region of CM. Regions tagged with contents labels containing CM cannot contribute to the boundary of A, since these regions are always subsets of the boundary of CM. Since the boundaries of regions tagged with contents labels containing CM don't contribute to the boundary of A, A does not contribute to the boundaries of regions tagged with contents labels containing CM. Therefore, any regions tagged with contents labels containing CM are not automatically affected if the boundary of the region tagged with A changes. Further, any regions tagged with contents labels which are not subsets of A are not automatically affected if the boundary of the region tagged with A changes. For example, FIG. 6 shows five overlapping objects A, B, C, D and E, representing a root region group ((A over B) over C) over (D over E). [Intersection regions are bold]. The root region group ((A over B) over C) over (D over E), will contain the secondary dependency Dag 700, as shown in FIG. 7. If A is moved, resulting in primary boundary damage being applied to the peak ((AoB)oC)oD. Secondary boundary damage is applied to (BoC)oD and CoD. Further, (AoC)oD will have primary boundary damage. The region groups (BoC)o(DoE), (BoC) oE, Co(DoE) and (CoE) are not affected since these region groups are not subsets of ((AoB)oC)oD as these region groups contain E. The above examples, demonstrate that the method of applying secondary boundary damage to all contents labels which are subsets of a primary boundary damaged peak is both necessary and efficient.

5.0 Preferred Apparatus

Figure 10:
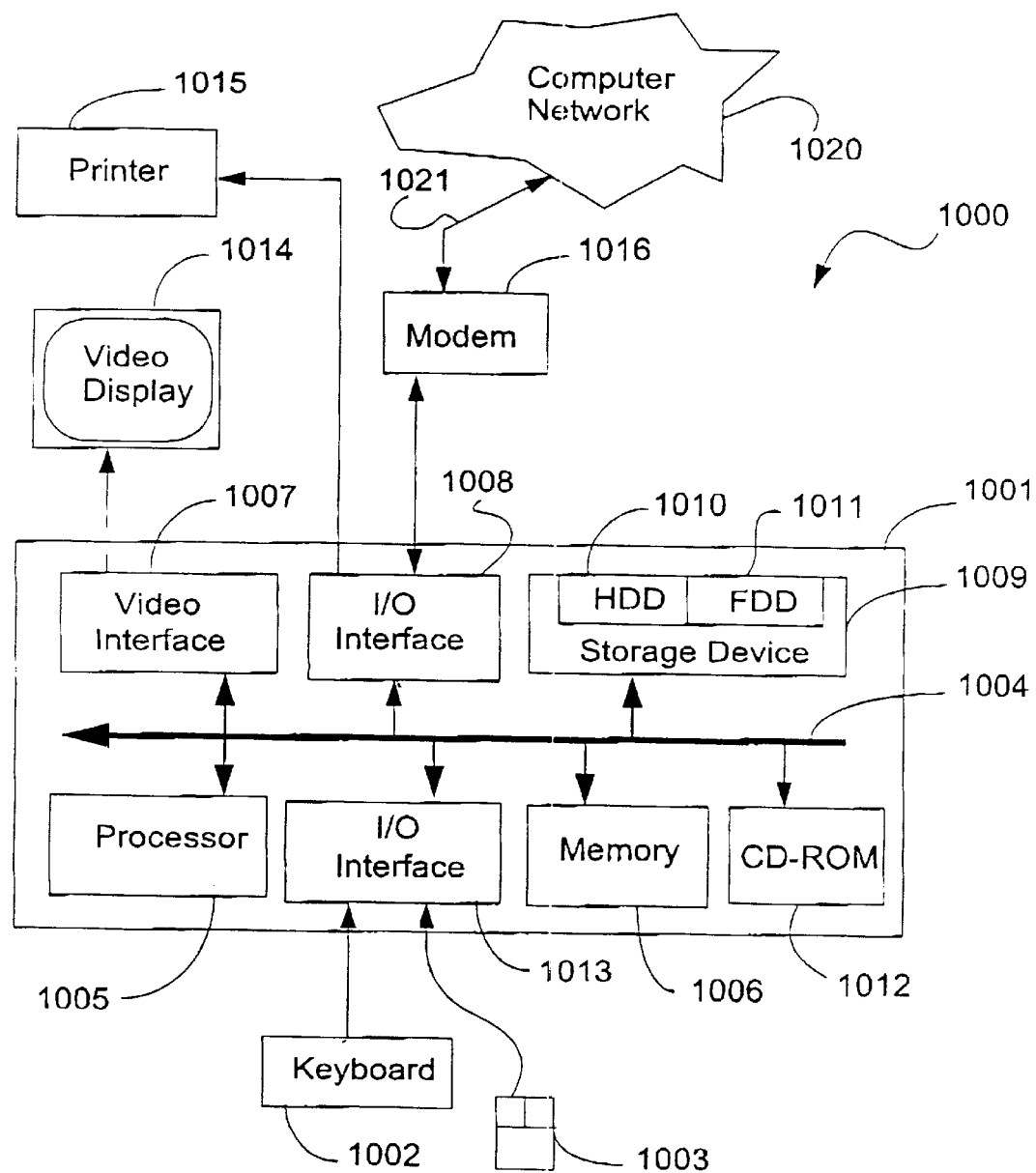
FIG. 10 is a schematic block diagram of a general purpose computer upon which the preferred embodiment of the present invention can be practiced.

The method of creating a series of images is preferably practiced using a conventional general-purpose computer system 1000, such as that shown in FIG. 10 wherein the processes outlined by FIG. 8 and the above pseudo-code can be implemented as software, such as an application program executing within the computer system 1000. In particular, the steps of method of creating a series of images are effected by instructions in the software that are carried out by the computer. The software can be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for creating a series of images in accordance is with the embodiments of the invention.

The computer system 1000 comprises a computer module 1001, input devices such as a keyboard 1002 and mouse 1003, output devices including a printer 1015 and a display device 1014. A Modulator-Demodulator (Modem) transceiver device 1016 is used by the computer module 1001 for communicating to and from a communications network 1020, for example connectable via a telephone line 1021 or other functional medium. The modem 1016 can be used to obtain access to the Internet, and other network systems, such as a Local Area Network (LAN) or a Wide Area Network (WAN).

The computer module 1001 typically includes at least one processor unit 1005, a memory unit 1006, for example formed from semiconductor random access memory (RAM) and read only memory (ROM), input/output (I/O) interfaces including a video interface 1007, and an I/O interface 1013 for the keyboard 1002 and mouse 1003 and optionally a joystick (not illustrated), and an interface 1008 for the modem 1016. A storage device 1009 is provided and typically includes a hard disk drive 1010 and a floppy disk drive 1011. A magnetic tape drive (not illustrated) may also be used. A CD-ROM drive 1012 is typically provided as a non-volatile source of data. The components 1005 to 1013 of the computer module 1001, typically communicate via an) interconnected bus 1004 and in a manner which results in a conventional mode of operation of the computer system 1000 known to those in the relevant art. Examples of computers on which the embodiments can be practised include IBM-PC's and compatibles, Sun Sparcstations or alike computer systems evolved therefrom.

Typically, the application program of the preferred embodiment is resilient on the hard disk drive 1010 and read and controlled in its execution by the processor 1005 Intermediate storage of the program and any data fetched from the network 1020 may be accomplished using the semiconductor memory 1006, possibly in concert with the hard disk drive 1010. In some instances, the application program may be supplied to the user encoded on a CD-ROM or floppy disk and read via the corresponding drive 1012 or 1011, or alternatively may be read by the user from the network 1020 via the modem device 1016. Still further, the software can also be loaded into the computer system 1000 from other computer readable medium including magnetic tape, a ROM or integrated circuit, a magneto-optical disk, a radio or infra-red transmission channel between the computer module 1001 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The method of creating a series of images can alternatively be implemented in dedicated hardware such as one or more integrated circuits performing the functions or sub functions of FIG. 8 and the above pseudo-code. Such dedicated hardware may include graphic processors, digital signal processors, or one or more microprocessors and associated memories.

The foregoing describes only one embodiment/some embodiments of the present invention, and modifications and/or changes can be made thereto without departing from the scope and spirit of the invention, the embodiment(s) being illustrative and not restrictive.

APPENDIX 1

(a)
```
struct CL_DagNodeRef
{
    CL_DagNode
    *cdnr_Ref;
    CL_DagNodeRef
    *cdnr_Next;
};
```
where:
(i) cdnr_Ref: represents a pointer to a dag node; and
(ii) cdnr_Next: represents a pointer to the next item in the reference list.

APPENDIX 1-continued (b)
```
struct CL_DagNode
{
    CL_Properties       *cdn_CLab;
    int                 cdn_TravStamp;
    Bool                cdn_Remove;
    CL_SeeDepDag        *cdn_Dag;
    CL_DagNodeRef       *cdn_Parents;
    CL_DagNodeRef       *cdn_Children;
    CL_DagNode          *cdn_Next;
};
```
where:
(i) cdn_Clab: represents the contents label which the dag node represents;
(ii) cdn_TravStamp: represents an integer storing the value of the containing dag's cli_TravCount member. This is used to determine whether or not a node has already been visited during a particular traversal, without needing to set flags which need a second as to clear;
(iii) cdn_Remove: represents a flag which is set when a dag node is no longer required but cannot be removed immediately because it isn't a peak. The node will be deleted when all of its parents have been deleted.
(iv) cdn_Dag: represents a pointer to the dag which this node is a member of. This is used to determine whether a particular contents label already is represented within a particular dag without having to undertake a dag traversal.
(v) cdn_Parents: represents a pointer to a linked list of contents label dag node reference structures (i.e. CL_DagNodeRef) structures representing the parents of the dag node. If NULL, then the node has no parents and so is a peak of its dag;
(vi) cdn_Children: represents a pointer to a linked list of CL_DagNodeRef structures representing the children of the dag node. If NULL, then the node has no children; and
(vii) cdn_Next: represents a pointer to the next dag node in a contents label's list of dag nodes. This is required since a contents label can be represented in a number of secondary dependency dags at the same time.

(c)
```
struct CL_SecDepDag
{
    CL_DagNodeRef       *cdag_Peaks;
    int                 cdag_TravCount;
};
```
where:
(i) cdag_Peaks: represents a pointer to a linked list of CL_DagNodeRef structures representing the peaks of the dag. Initially NULL.
(ii) cdag_TravCount: represents an integer representing the number of traversals undertaken in this particular dag. It is used for visited node determination during traversals.

(d)
```
struct CL_Properties
{
    CL_Properties       *clp_Ancestors[2];
    OPS_Operator        clp_Op;
    Int16               clp_nRefs;
    Int16               clp_Flags;
    int                 clp_PriDepsLen;
    CL_Properties       **clp_PriDeps;
    union
    {
        CL_DagNode      *clp_DagNodes;
        CL_Properties   *clp_LeafSelfPtr;
    } clp_U;
    Int16               clp_LeftCLabsLen;
    Int16               clp_RightCLabsLen;
    CL_Properties       **clp_LeafCLabs;
#ifdef CL_DEBUG_CLABS
    int                 clp_DebugCLab;
#endif
};
```
where:
(i) clp_Ancestors: represent a two element array storing the two contents labels which are the direct ancestors of this contents label. The first element represents the left ancestor. If the contents label is not a composite contents label, both elements of the array will be NULL. In the case where the properties structure is not active and is a member of the instance's free list, clp_Ancestor[0] points to the next element in the free list;
(ii) clp_Op: is used for binary nodes and is the compositing operator used to combine the content of the left and right ancestors. For leaf node contents labels (ie ancestors[0] is NULL), it is undefined;
(iii) clp_nRefs: represents the reference count of the contents label. Each reference can come from a number of sources:
    1. The contents label is the key of a region in a region group.
    2. Being an ancestor of a contents label in the primary dependencies dag.
       This is to ensure that an ancestor is never freed before its descendents.
    3. Being the key of an item in a damage hash table.

APPENDIX 1-continued

4. Being the key of an element in a destination partitioning.
 5. For leaf node contents labels, being referred to in a LA_ContentInfo structure.
 6. For binary contents labels, having an entry in a secondary dependencies dag.
 7. Being an entry in a binary node's array of unlinked contents labels;

(iv) clp_Flags: represents a flag register storing two groups of flags:
   Two mutually exclusive flags dealing with the opacity properties of the content:
   1. CL_PF_OPAQUE — The contents label represents opaque content.
   2. CL_PF_TRANSPARENT — The contents label represents completely transparent content. This flag is only set in composite contents labels with certain compositing operators and certain ancestor opaqueness properties. For example a contents label representing opaque A xor opaque B will have the transparent flag set.
   Two flags which describe rendering optimisations:
   1. CL_PF_RENDOPT_LEFT — The content of the left ancestor is required to compute this content label's content.
   2. CL_PF_RENDOPT_RIGHT — The content of the right ancestor is required to compute this content label's content;

(v) clp_PriDepsLength: represents the number of allocated elements in the clp_PriDeps array;

(vi) clp_PriDeps: represents an array of contents labels representing the primary dependencies of the contents label. The array can contain NULL pointers, representing deleted primary dependencies. When a pointer is added to the array, it is searched to see if a free slot exists, before any memory is allocated. This is sufficient because the size of a primary dependency array is typically small;

(vii) clp_DagNodes: represents a pointer to the first element in a linked list of dag nodes. Each item in the linked list represents a node in a dag in which the contents label is represented. Typically, each binary contents label will be represented in only a single dag. Sometimes, though, due to non-deleted nodes, tree editing etc, it is possible for a contents label to be represented in more than one dag. Only used in composite contents labels;

(viii) clp_LeafSelfPtr: is used for leaf contents labels and is a pointer to itself. The clp_LeafCLabs array is used to point to this variable for leaf nodes to avoid allocating memory for a single pointer;

(ix) clp_LeftCLabsLen is used for a composite contents label. The number of leaf nodes contributing to the left-hand side and is always 1 for a leaf contents label;

(x) clp_RightCLabsLen: is used for a composite contents label, the number of leaf nodes contributing to the right hand side and is always 0 for a leaf contents label;

(xi) clp_LeafCLabs: represents an array of contents labels representing the leaf node contents labels contributing to the a binary contents label. The pointers are arranged in tree order (i.e. the order that they would be encountered in a depth-first, left-to-right traversal of the compositing tree). The first clp_LeftClabsLen pointers contribute to the left side, the remainder contribute to the right side; and (xii) clp_DebugCLab: represents contents labels which are no longer a set of monotonically increasing integers. Preferably, in debug builds, a unique small integer can be stored in the properties structure to make contents labels more "recognisable" during debugging.

(e)
struct CL_HashItem
{
    CL_Properties                   *clhi_CLKeys[2];
    OPS_Operator                   clhi_OpKey;
    CL_Properties                   *clhi_Result;
};
where:
(i) clhi_CLKeys: represents a pair of contents labels which comprise part of the hash function key;
(ii) clhi_OpKey: represents the compositing operator used to combine the two contents labels and completes the lookup key; and
(iii) clhi_Result: represents the contents label which represents (clhi_CLKeys[0] clhi_OpKeyclhi_CLKey[1]).

(f)
struct CL_PropertiesChunk
{
    CL_Properties                   clpc_Items[. . .],
    CL_PropertiesChunk         *clpc_Next;
};
where:
(i) clpc_Items: represents an array of CL_Properties structures allocated after the chunk header in memory; and
(ii) clpc_Next: represents a pointer to the next chunk in the list.

(g)
struct CL_DagNodeRefChunk
{
    CL_DagNodeRef
    cdnrc_Items[. . .];
    CL_DagNodeChunk
    *cdnrc_Next;
};

APPENDIX 1-continued where:
(i) cdnrc_Items: represents an array of CL_DagNodeRef structures allocated after the chunk header in memory; and
(ii) cdnrc_Next: repesents a pointer to the next chunk in the list.
(h)
struct CL_DagNodeChunk
{
    CL_DagNode                 cdnc_Items[. . .];
    CL_DagNodeChunk       *cdnc_Next;
};
where:
(i) cdnc_Items: represents an array of CL_DagNode structures allocated after the chunk header in memory; and.
(ii) cdnc_Next: represents a pointer to the next chunk in the list.
(I)
struct CL_Instance
{
    int                      cli_HashNels;
    int                      cli_HashLength;
    CL_HashItem           *cli_HashTable;
    CL_PropertiesChunk     *cli_PropChunks;
    CL_Properties          *cli_PropFreeList;
    CL_DagNodeRefChunk     *cli_DagNodeRefChunks;
    CL_DagNodeRef          *cli_DagNodeRefFreeList;
    CL_DagNodeChunk       *cli_DagNodeChunks;
    CL_DagNode             *cli_DagNodeFreeList;
ifdef CL_DEBUG_CLABS
    int                      cli_NextDebugCLab;
endif
};
where:
(i) cli_HashNels: represents the number of non empty elements in the cli_HashTable array. An entry is regarded as empty if clhi_CLKeys[0] is NULL. cli_HashNels must be strictly less than cli_HashLength;
(ii) cli_HashLength: represents the number of allocated elements in the cli_HashTable array. The value represented by cli_HashLength is a power of 2;
(iii) cli_HashTable: represents the hash table array;
(iv) cli_PropChunks: is a pointer to the linked list of CL_PropertiesChunk structures which have been allocated. To free all of an instance's properties structures, all of the chunks associated with the instance must be freed;
(v) cli_PropFreeList: is a pointer to a linked list of free CL_Properties structures. If cli_PropFreeList is equal to NULL and a new properties structure is required, then a new chunk structure will need to be allocated;
(vi) cli_DagNodeRefChunks: is a pointer to the linked list of CL_DagNodeRefChunk structures which have been allocated. To free all of an instance's dag nodes references, all chunks associated with the instance must be freed;
(vii) cli_DagNodeRefFreeList: is a pointer to a linked list of free CL_DagNodeRef structures. If cli_DagNodeRefFreeList is equal to NULL and a new dag node reference is required, then a new chunk structure will need to be allocated;
(viii) cli_DagNodeChunks: is a pointer to the linked list of CL_DagNodeChunk structures which have been allocated. To free all of an instance's dag nodes, all chunks associated with the instance should be freed;
(ix) cli_DagNodeFreeList: is a pointer to a linked list of free CL_DagNode structures. If cli_DagNodeFreeList is equal to NULL and a new dag node is required, then a new chunk structure needs to be allocated; and
(x) cli_NextDebugCLab: represents an integer which, in debug builds, contains the number which becomes the debug contents label of the next properties structure obtained from the free list. After each properties structure is obtained, cli_NextDebugCLab is preferably incremented.
(J)
enum CL_Boundary Damage
{
    CL_NONE,
    CL_BD_SECONDARY,
    CL_BD_PRIMARY
};
where:
CL_BD_NONE: indicates that the contents label has no boundary damage;
CL_BD_SECONDARY: indicates that the contents label is to be damaged with secondary boundary damage; and
CL_BD_PRIMARY: indicates that the contents label is to be damaged with primary boundary damage meaning that the contents label's secondary dependencies are to be damaged with secondary boundary damage.

What is claimed is:

1. A method of creating a series of images, each member of said series being related to a preceding member, said images being formed by rendering a plurality of graphical objects according to a compositing tree representing a compositing expression, said compositing tree including a plurality of nodes each representing a component of at least one of said images, each of said objects having a predetermined outline, said method comprising the steps of:

(a) for each said node, dividing a component image space in which said outlines are defined into one or more mutually exclusive regions, each said region being related to at least one graphical object and being substantially formed by one or more of said predetermined outlines, wherein each said node has at least one associated region;

(b) generating at least one directed acyclic graph for substantially each node of said compositing tree, said directed acyclic graph identifying, for at least one region associated with a particular node, those regions associated with any other nodes of said compositing tree that if changed can affect said at least one region;

(c) rendering a first image of said series by compositing any one or more of said regions substantially according to said compositing tree;

(d) in response to at least one change to at least one of said nodes of said compositing tree, (i) examining the directed acyclic graph corresponding to said at least one node to identify those of said regions affected by said at least one change, wherein if at least one of said regions associated with said at least one node is indirectly affected by a change to at least one other of said regions associated with any other node of said compositing tree, said indirectly affected region is identified by inference through association with at least one other of said affected regions, said inference being determined through said examination of the directed acyclic graph corresponding to said at least one node, (ii) for each node having affected regions, updating the corresponding identified regions and incorporating into said node those new regions arising from the change and/or removing any of said regions that are no longer relevant, (iii) updating directed acyclic graphs corresponding to at least each node having affected regions to reflect changes to said compositing tree, and (iv) rendering a further image of said series by compositing those regions affected by said at least one change; and (e) repeating step (d) for further changes to at least one of said nodes of said compositing tree.

2. A method according to claim 1, further comprising the step of approximating each said predetermined outline on the outside and the inside to form an outline region.

3. A method according to claim 2, wherein each said outline region is approximated to a grid.

4. A method according to claim 1, wherein step (b) includes examining each said region to determine an opacity of each of said objects within said region.

5. A method according to claim 1, wherein a dependency information is created for each of said regions.

6. A method according to claim 1, wherein said directed acyclic graph includes:

a first dependency list identifying those regions directly affected by a change to a particular region; and a second dependency list identifying those regions indirectly affected by a change to said particular region.

7. A method according to claim 6, wherein directly affected regions are those regions having content modified as a consequence of change.

8. A method according to claim 6, wherein indirectly affected regions are those regions which may include modified region outlines and/or content generation as a result of change.

9. A method according to claim 1, wherein at least one change includes changing the attributes of nodes of said compositing tree.

10. A method according to claim 1, wherein each of said mutually exclusive regions comprises a label.

11. A method according to claim 10, wherein said label is configured as a pointer to a properties structure.

12. A method according to claim 11, wherein said properties structure comprises data defining the properities of a region associated with said structure.

13. A method of creating a series of images, said images being formed by rendering a plurality of graphical objects to be composited according to a compositing tree, said compositing tree including a plurality of nodes each representing a component of at least one of said images, each of said objects having a predetermined outline, said method comprising the steps of:

(a) for each said node, dividing a space in which said outlines are defined into one or more mutually exclusive regions, wherein each said node has at least one associated region;

(b) generating at least one directed acyclic graph for substantially each node of said compositing tree, said directed acyclic graph identifying, for at least one region associated with a particular node, those regions associated with any other nodes of said compositing tree that if changed can affect said at least one region;

(c) rendering a first image of said series utilising said compositing tree;

and then, in response to at least one change to at least one of said nodes, (d) examining said directed acyclic graphs for substantially each node of said compositing tree, (i) for a node with affected regions, updating the corresponding regions on the basis of said examination, wherein if at least one of said regions is indirectly affected by a change to at least one other of said regions, said indirectly affected region is identified by inference through association with at least one other of said affected regions, said inference being determined through said examination of the directed acyclic graph corresponding to said node with affected regions, (ii) updating said directed acyclic graphs corresponding to at least each node having affected regions to reflect changes to said compositing tree, and (iii) rendering a further image of said series by compositing those regions -affected by said at least one change; and (e) repeating step (d) for further changes to at least one of said nodes of said compositing tree.

14. A method according to claim 13, further comprising the step of approximating each said predetermined outline on the outside and the inside to form an outline region.

15. A method according to claim 14, wherein each said outline region is approximated to a grid.

16. A method according to claim 13, wherein step (b) includes examining each said region to determine an opacity of each of said objects within said region.

17. A method according to claim 13, wherein a directed acyclic graph is created for each of said regions.

18. A method according to claim 13, wherein said directed acyclic graph includes:

a first dependency list identifying those regions directly affected by a change to a particular region; and a second dependency list identifying those regions indirectly affected by a change in said particular region.

19. A method according to claim 18, wherein directly affected regions are those regions having content modified as a consequence of change.

20. A method according to claim 18, wherein indirectly affected regions are those regions which may include modified region outlines and/or content generation as a result of change.

21. A method according to claim 13, wherein at least one change includes changing the attributes of nodes in said compositing tree.

22. A method according to claim 13, wherein each of said mutually exclusive regions comprises a label.

23. A method according to claim 22, wherein said label is configured as a pointer to a properties structure.

24. A method according to claim 23, wherein said properties structure comprises data defining the properties of a region associated with said structure.

25. A method of creating a series of images, said images being formed by rendering at least a plurality of graphical objects to be composited according to a compositing tree, said compositing tree including a plurality of nodes each representing a component of at least one of said images, said method comprising the steps of:
 (a) for each said node, dividing a component image space in which said graphical objects are defined into one or more regions, wherein each said node has at least one associated region;
 (b) generating at least one directed acyclic graph for substantially each node of said compositing tree, said directed acyclic graph identifying, for at least one region associated with a particular node, those regions associated with any other nodes of said compositing tree that if changed can affect said at least one region;
 (c) rendering a first image of said series utilising said compositing tree;
 and then, in response to at least one change to at least one of said nodes,
 (d) examining said directed acyclic graphs for substantially each node of said hierarchical structure, and
  (i) for a node with affected regions, updating the corresponding directed acyclic graphs, wherein if at least one of said regions is indirectly affected by a change to at least one other of said regions, said indirectly affected region is identified by inference from being associated with at least one other of said affected regions, said inference being determined through said examination of the directed acyclic graph corresponding to said node with affected regions,
  (ii) updating said directed acyclic graphs corresponding to at least each node having affected regions to reflect changes to said compositing tree, and
  (iii) rendering a further image of said series; and
 (e) repeating step (d) for further changes to at least one of said nodes of said compositing tree.

26. A method according to claim 25, further comprising the step of approximating each said predetermined outline on the outside and the inside to form an outline region.

27. A method according to claim 26, wherein each said outline region is approximated to a grid.

28. A method according to claim 25, wherein step (a) includes examining each said region to determine an opacity of each of said objects within said region.

29. A method according to claim 25, wherein said directed acyclic graph is created for each of said regions.

30. A method according to claim 25, wherein said directed acyclic graphs include:
 a first dependency list identifying those regions directly affected by a change to said one region; and
 a second dependency list identifying those regions indirectly affected by a change in said one region.

31. A method according to claim 30, wherein directly affected regions are those regions having content modified as a consequence of change.

32. A method according to any one of claim 30 or 31, wherein indirectly affected regions are those regions which may include modified region outlines and/or content generation as a result of change.

33. A method according to any one of claim 25, wherein at least one change includes changing the attributes of nodes in said compositing tree.

34. An apparatus for creating a series of images, each member of said series being related to a preceding member, said images being formed by rendering a plurality of graphical objects according to a compositing tree representing a compositing expression, said compositing tree including a plurality of nodes each representing a component of at least one of said images, each of said objects having a predetermined outline, said apparatus comprising:
 division means for dividing a component image space in which said outlines are defined, corresponding to each said node of said compositing tree, into one or more mutually exclusive regions, each said region being related to at least one graphical object and being substantially formed by one or more of said predetermined outlines, wherein each node of said compositing tree has at least one associated region;
 directed acyclic graph creation means for generating at least one directed acyclic graph for substantially each node of said hierarchical structure, said directed acyclic graph identifying, for at least one region associated with a particular node, those regions associated with any other nodes of said compositing tree that if changed can affect said at least one region;
 render means for rendering a first image of said series by compositing any one or more of said regions substantially according to said compositing tree;
 examination means for examining the directed acyclic graph corresponding to at least one of said nodes in response to at least one change to said at least one nodes, to identify those of said regions affected by said at least one change, wherein if at least one of said regions is indirectly affected by a change to at least one other of said regions associated with any other node of said compositing tree, said indirectly affected region is identified by inference through association with at least one other of said affected regions, said inference being determined through said examination of the directed acyclic graph corresponding to said at least one node, and wherein for each node with affected regions, the corresponding identified regions are updated by an updating means and those new regions arising from the change are incorporated into said node and/or any of said regions that are no longer relevant are removed, wherein the directed acyclic graphs corresponding to at least said nodes with affected regions are updated to reflect changes to said compositing tree, and wherein said render means renders a further image of said series by compositing those regions affected by said at least one change.

35. The apparatus according to claim 34, further comprising means for approximating each said predetermined outline on the outside and the inside to form an outline region.

36. The apparatus according to claim 35, wherein each said outline region is approximated to a grid.

37. The apparatus according to claim 34, wherein a directed acyclic graph is created for each of said regions.

38. The apparatus according to claim 34, wherein said directed acyclic graphs include:
   a first dependency list identifying those regions directly affected by a change to a particular region; and
   a second dependency list identifying those regions indirectly affected by a change in said particular region.

39. The apparatus according to claim 38, wherein directly affected regions are those regions having content modified as a consequence of change.

40. The apparatus according to claim 37, wherein indirectly affected regions are those regions which may include modified region outlines and/or content generation as a result of change.

41. The apparatus according to claim 34, wherein at least one change includes changing the attributes of nodes in said compositing tree.

42. The apparatus according to claim 34, wherein each of said mutually exclusive regions comprises a label.

43. The apparatus according to claim 42, wherein said label is configured as a pointer to a properties structure.

44. The apparatus according to claim 43, wherein said properties structure comprises data defining the properties of a region associated with said structure.

45. A computer readable medium for storing a program for apparatus which processes data, said processing comprising a process for creating a series of images, each member of said series being related to a preceding member, said images being formed by rendering a plurality of graphical objects to be composited according to a compositing tree representing a compositing expression, said compositing tree including a plurality of nodes each representing a component of at least one of said images, each of said objects having a predetermined outline, said program comprising:
   code for dividing a component image space in which said outlines are defined into one or more mutually exclusive regions, each said region being related to at least one graphical object and being formed by one or more of said predetermined outlines, wherein each node of said compositing tree has at least one associated region;
   code for generating at least one directed acyclic graph for substantially each node of said compositing tree, said directed acyclic graph identifying, for at least one region associated with a particular node, those regions that if changed can affect said at least one region;
   code for rendering a first image of said series by compositing any one or more of said regions substantially according to said compositing tree;
   code for examining said directed acyclic graph corresponding to at least one of said nodes in response to at least one change to said at least one nodes, to identify those of said regions affected by said at least one change, wherein if at least one of said regions is indirectly affected by a change to at least one other of said regions associated with any other node of said compositing tree, said indirectly affected region is identified by inference through association with at least one other of said affected regions, said inference being determined through said examination of the directed acyclic graph corresponding to said at least one node;
   code for updating the corresponding identified regions for each node with affected regions, and incorporating into said node those new regions arising from the change and/or removing any of said regions that are no longer relevant;
   code for updating the directed acyclic graphs corresponding to at least said nodes with affected regions to reflect changes to said compositing tree; and
   code for rendering a further image of said series by compositing those regions affected by said at least one change.

* * * * *

UNITED STATES PATENT AND TRADEMARK OFFICE
CERTIFICATE OF CORRECTION

PATENT NO. : 6,756,994 B1
DATED : June 29, 2004
INVENTOR(S) : Martin Paul Tlaskal It is certified that error appears in the above-identified patent and that said Letters Patent is hereby corrected as shown below:

Column 1,
Line 47, "too" should read -- two --.

Column 3,
Line 4, "region," should read -- region --; and "object" should read -- object, --;
Line 13, "sonic" should read -- some --;
Line 16, "affected" should read -- affected. --;
Line 31, "effected" should read -- affected --;
Line 46, "secondary" should read -- secondarily --; and
Line 48, "primary" should read -- primarily --.

Column 4,
Line 30, "relevant," should read -- relevant; --; and
Line 54, "chance" should read -- change --.

Column 6,
Line 58, "result being" should read -- result of being --.

Column 7,
Line 33, "usable," should read -- usage, --.

Column 8,
Line 64, "all" should read -- an --.

Column 9,
Line 6, "bar" should read -- by --;
Line 41, "no:" should read -- not --;
Line 52, "References," should read -- References --;
Line 56, "presented" should read -- represented --; and
Line 61, "file" should read -- the --.

Column 10,
Line 9, "bad" should read -- by --; and
Line 15, "tar" should read -- tag --.

Column 11,
Line 21, "secondary" should read -- secondarily --;
Line 23, "primary" should read -- primarily --;
Line 30, "(a o b)" should read -- (a op b) --; and
Line 37, "primarily-damaged" should read -- primarily-damaged --.

UNITED STATES PATENT AND TRADEMARK OFFICE
CERTIFICATE OF CORRECTION

PATENT NO.     : 6,756,994 B1
DATED          : June 29, 2004
INVENTOR(S)    : Martin Paul Tlaskal It is certified that error appears in the above-identified patent and that said Letters Patent is hereby corrected as shown below:

Column 12,
Line 66, "pseodo-code" should read -- pseudo-code --.

Column 13,
Line 17, "← NULL" should read -- ← NULL. ¶ end. --.

Column 14,
Line 1, "pseudocode" should read -- pseudo-code --.

Column 16,
Line 45, "early.," should read -- early, --; and
Line 65, "clp_LeftClabsLen ← left's clp_LeftClabsLen – left's" should read
-- clp_LeftCLabsLen ← left's clp_LeftCLabsLen + left's --.

Column 17,
Line 4, "clp_LeafClabs ← call malloc for an array of (clp_LeftClabsLen –" should read
-- clp_LeafCLabs ← call malloc for an array of (clp_LeftClabsLen + --.

Column 19,
Line 60, "currency" should read -- currently --.

Column 23,
Line 15, "contain" should read -- contains --; and
Line 22, "dag_node)." should read -- dag_node. --.

Column 27
Line 25, "is a peak in its dag then" should read -- (dag_node) attached to clab do --;
Line 35, "label A" should read -- label. A --;
Line 60, "end." should be deleted; and
Line 64, "ist" should read -- is --.

Column 29,
Line 38, "right_clabs len" should read -- right_clabs_len --; and
Line 59, "contruction." should read -- construction. --.

Column 31,
Line 35, "node." should read -- node, --.

UNITED STATES PATENT AND TRADEMARK OFFICE
CERTIFICATE OF CORRECTION

PATENT NO. : 6,756,994 B1
DATED : June 29, 2004
INVENTOR(S) : Martin Paul Tlaskal It is certified that error appears in the above-identified patent and that said Letters Patent is hereby corrected as shown below:

Column 33,
Line 24, "dag." should read -- dag, --;
Line 54, "then then" should read -- then --; and
Line 57, "it's" should read -- its --.

Column 35,
Line 15, "deleted" should read -- deleted, --;
Line 39, "departing the" should read -- departing from the --; and
Line 41, "rather sequential." should read -- rather than sequential. --.

Column 36,
Lines 50 and 54, "secondary" should read -- secondarily --.

Column 37,
Line 14, "((AoB)oC)oD. Secondary" should read -- ((AoB)oC)oD, secondary --.

Column 38,
Line 13, "an)" should read -- an --;
Line 21, "resilient" should read -- resident --; and
Line 22, "processor 1005" should read -- processor 1005. --.

Column 43,
Line 13, "and." should read -- and --.

Column 46,
Line 8, "properities" should read -- properties --; and
Line 48, "-affected" should read -- affected --.

Column 47,
Line 37, "and" should be deleted.

Column 48,
Line 5, "claim" should read -- claims --;
Line 9, "any one of" should be deleted; and
Line 36, "tree;" should read -- tree; and --.

UNITED STATES PATENT AND TRADEMARK OFFICE
CERTIFICATE OF CORRECTION

PATENT NO.    : 6,756,994 B1
DATED         : June 29, 2004
INVENTOR(S)   : Martin Paul Tlaskal It is certified that error appears in the above-identified patent and that said Letters Patent is hereby corrected as shown below:

<u>Column 49</u>,
Line 10, "claim 37," should read -- claim 45 --.

Signed and Sealed this

Fourteenth Day of June, 2005

JON W. DUDAS
*Director of the United States Patent and Trademark Office*